Nov. 21, 1950 H. GANG 2,531,207

REGISTRATION AND SHIFT CONTROL MEANS

Filed Feb. 16, 1948 22 Sheets-Sheet 1

WITNESS:
George V. Hall

INVENTOR
Herman Gang
BY
Stuart Hilder
ATTORNEY

REGISTRATION AND SHIFT CONTROL MEANS

WITNESS:
George V. Hall

INVENTOR
Herman Gang
BY
Stuart Wilder
ATTORNEY

Nov. 21, 1950 H. GANG 2,531,207

REGISTRATION AND SHIFT CONTROL MEANS

Filed Feb. 16, 1948 22 Sheets-Sheet 3

WITNESS:
George V. Hall

INVENTOR
Herman Gang
BY Stuart I. Wilder
ATTORNEY

Nov. 21, 1950 H. GANG 2,531,207

REGISTRATION AND SHIFT CONTROL MEANS

Filed Feb. 16, 1948 22 Sheets-Sheet 4

WITNESS
George V. Hall

INVENTOR
Herman Gang

BY Stuart D. Fidler
ATTORNEY

Nov. 21, 1950 H. GANG 2,531,207

REGISTRATION AND SHIFT CONTROL MEANS

Filed Feb. 16, 1948 22 Sheets-Sheet 5

WITNESS:
George V. Hall

INVENTOR
Herman Gang

BY Stuart Wilder
ATTORNEY

WITNESS:
George V. Hall

INVENTOR.
Herman Gang
BY
Stuart Wilder
ATTORNEY.

REGISTRATION AND SHIFT CONTROL MEANS

Filed Feb. 16, 1948 22 Sheets-Sheet 7

WITNESS:
George V. Hall

INVENTOR
Herman Gang
BY
Stuart Wilder
ATTORNEY

REGISTRATION AND SHIFT CONTROL MEANS

Filed Feb. 16, 1948 22 Sheets-Sheet 8

WITNESS:
George V. Hall

INVENTOR
Herman Gang
by Stuart Hilder
ATTORNEY

Nov. 21, 1950 H. GANG 2,531,207

REGISTRATION AND SHIFT CONTROL MEANS

Filed Feb. 16, 1948 22 Sheets-Sheet 9

WITNESS
George V. Hall

INVENTOR
Herman Gang
BY Stuart J. Hilder
ATTORNEY

Nov. 21, 1950 H. GANG 2,531,207

REGISTRATION AND SHIFT CONTROL MEANS

Filed Feb. 16, 1948 22 Sheets-Sheet 10

WITNESS:
George V. Hall

INVENTOR
Herman Gang
BY
Stuart Hilder,
ATTORNEY

Nov. 21, 1950 H. GANG 2,531,207

REGISTRATION AND SHIFT CONTROL MEANS

Filed Feb. 16, 1948 22 Sheets-Sheet 11

INVENTOR
Herman Gang

BY Stuart Wilder
ATTORNEY

WITNESS:
George V. Hall

REGISTRATION AND SHIFT CONTROL MEANS

Filed Feb. 16, 1948 22 Sheets-Sheet 12

WITNESS:
Georg V. Hall

INVENTOR
Herman Gang
BY
Stuart Wilde
ATTORNEY

REGISTRATION AND SHIFT CONTROL MEANS

Filed Feb. 16, 1948 22 Sheets-Sheet 13

WITNESS: Georg V. Hall

INVENTOR
Herman Gang
BY Stuart D. Gilder
ATTORNEY

Nov. 21, 1950 H. GANG 2,531,207

REGISTRATION AND SHIFT CONTROL MEANS

Filed Feb. 16, 1948 22 Sheets-Sheet 14

WITNESS:
George V. Hall

INVENTOR
Herman Gang
BY Stuart Wilder
ATTORNEY

WITNESS:
George V. Hall

INVENTOR
Herman Gang
BY Stuart Wilder
ATTORNEY

Nov. 21, 1950 H. GANG 2,531,207

REGISTRATION AND SHIFT CONTROL MEANS

Filed Feb. 16, 1948 22 Sheets-Sheet 16

WITNESS:
George V. Hall

INVENTOR
Herman Gang
BY
Stuart Hilder
ATTORNEY

Nov. 21, 1950 H. GANG 2,531,207

REGISTRATION AND SHIFT CONTROL MEANS

Filed Feb. 16, 1948 22 Sheets-Sheet 17

INVENTOR
Herman Gang

Stuart [illegible]
ATTORNEY

WITNESS:
George V. Hall

Nov. 21, 1950 H. GANG 2,531,207

REGISTRATION AND SHIFT CONTROL MEANS

Filed Feb. 16, 1948 22 Sheets-Sheet 18

WITNESS:
George V. Hall

INVENTOR
Herman Gang
BY
Stuart & Wilder
ATTORNEY

WITNESS:
George V. Hall

INVENTOR
Herman Gang
BY Stuart Hilde
ATTORNEY

WITNESS:
George V. Hall

INVENTOR
Herman Gang
BY
Stuart Hilder.
ATTORNEY

REGISTRATION AND SHIFT CONTROL MEANS

Filed Feb. 16, 1948 22 Sheets-Sheet 21

WITNESS:
George V. Hall

INVENTOR
Herman Gang
BY Stuart Hilder.
ATTORNEY

REGISTRATION AND SHIFT CONTROL MEANS

Filed Feb. 16, 1948 22 Sheets-Sheet 22

WITNESS:
George V. Hall

INVENTOR
Herman Gang
BY
Stuart Wilder
ATTORNEY

Patented Nov. 21, 1950 2,531,207

UNITED STATES PATENT OFFICE 2,531,207

REGISTRATION AND SHIFT CONTROL MEANS

Herman Gang, Livingston, N. J., assignor to Monroe Calculating Machine Company, Orange, N. J., a corporation of Delaware Application February 16, 1948, Serial No. 8,548

18 Claims. (Cl. 235—62)

The invention has relation to means for controlling plural order operations in a machine designed to calculate and register automatically the products and quotients derived from two preset factors; these operations involving certain known sequences of plus and/or minus registration and of denominational shifting of the product-dividened register. The invention provides novel registration and shift controlling means for such machines.

The controlling means include dual purpose devices which, upon initiation of a program of multiplication, are adjustable to control the sign of registration and shift direction determining means. Alternatively, adjustments are effected, upon the initation of a program of division, whereby the sign and shift direction control means in conjunction with other devices are adapted for operation in connection with the division program.

Also, the plus, minus, shift controlling means may be associated in novel manner with certain ancillary devices controlling various clearout operations and the return of the product register to its initial denominational position.

The invention consists in the novel construction and combination of parts, as set forth in the appended claims.

In the accompanying drawings, illustrating an embodiment of the invention:

Figure 29:
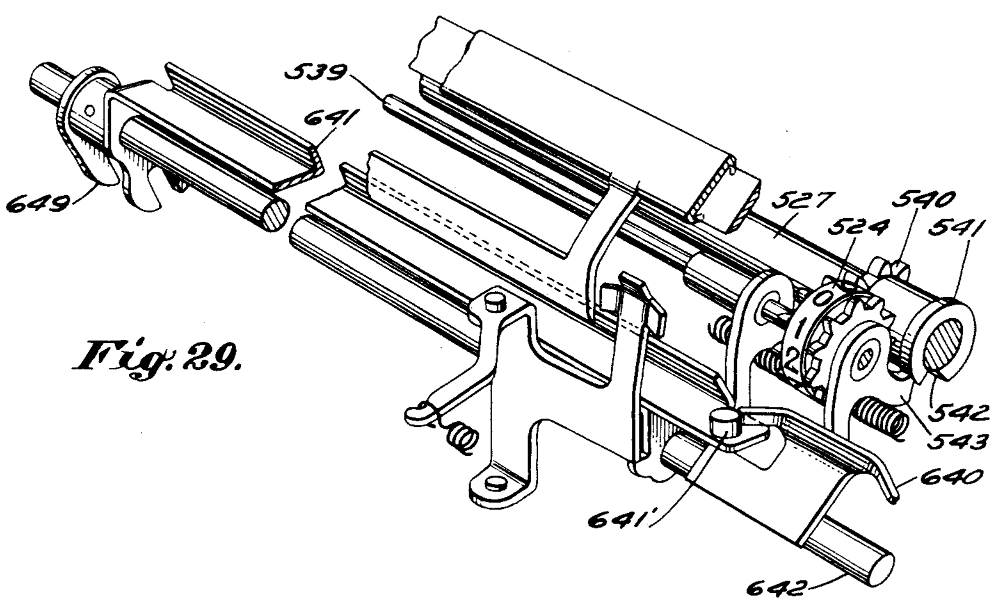
Fig. 29 is a fragmentary perspective view showing the multiplication control bails and parts associated therewith.
Figure 29A:
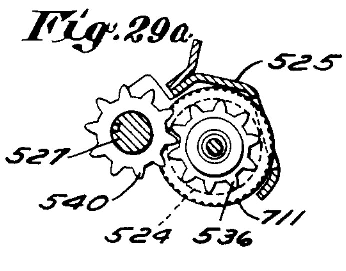
Figures 30, 31, 32:
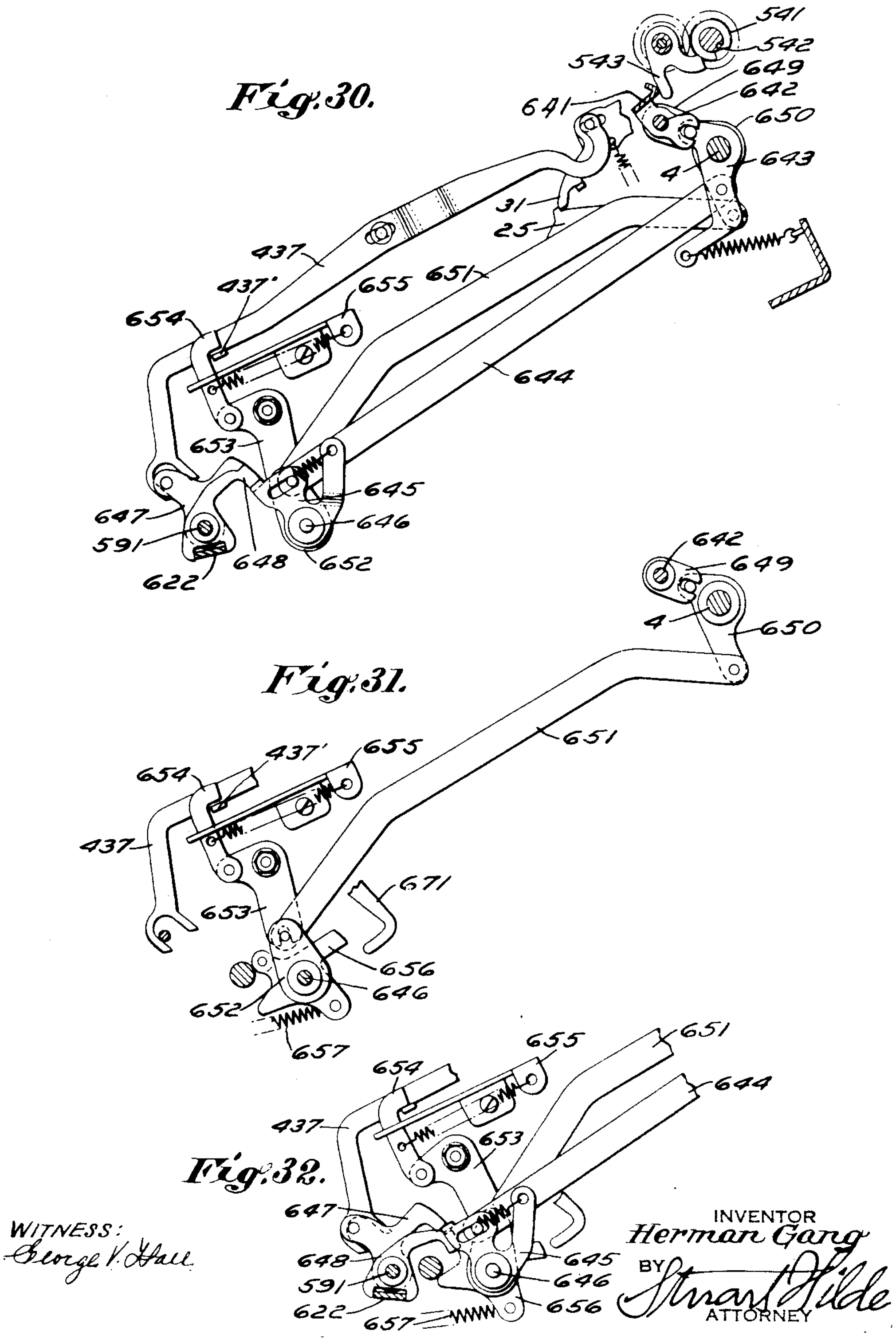
Figure 33:
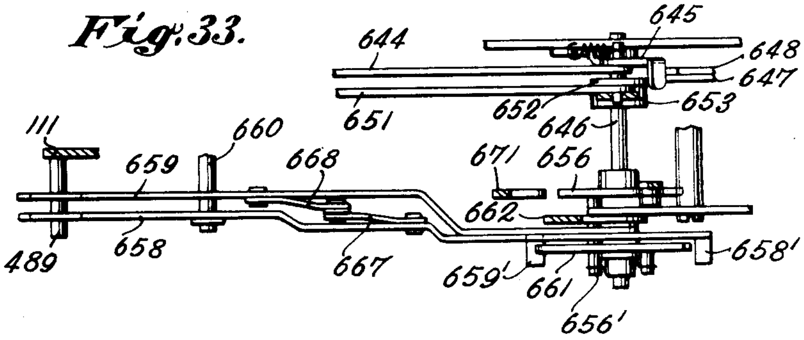
Figure 34:
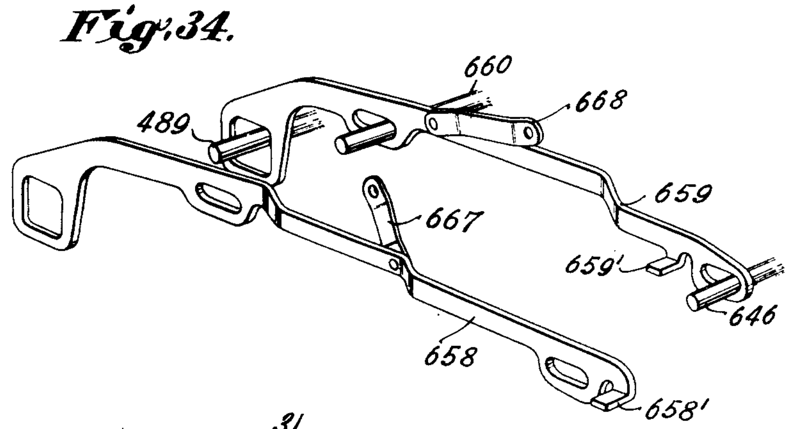
Figure 35:
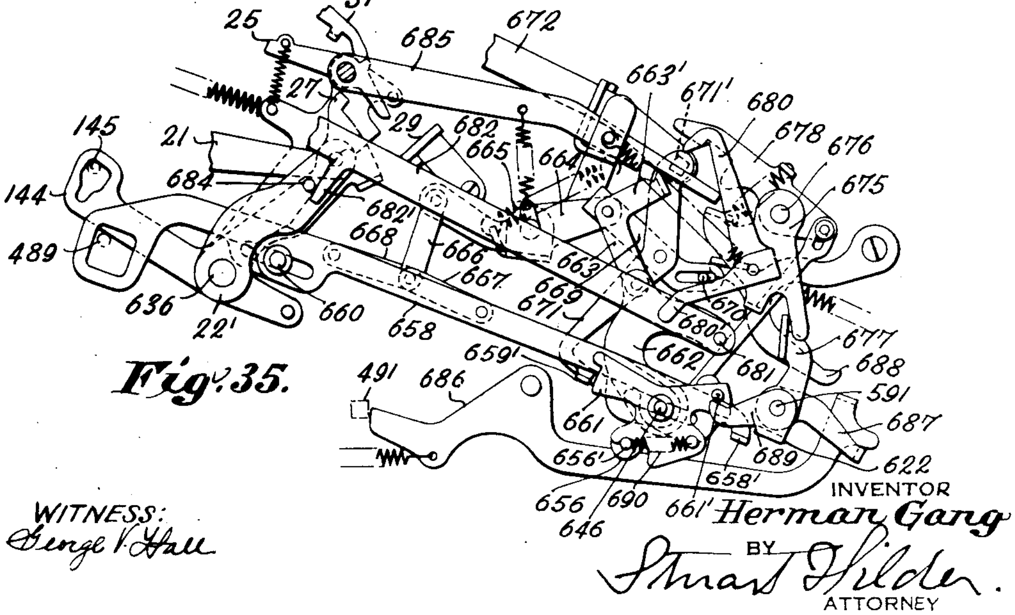
Figures 36, 38:
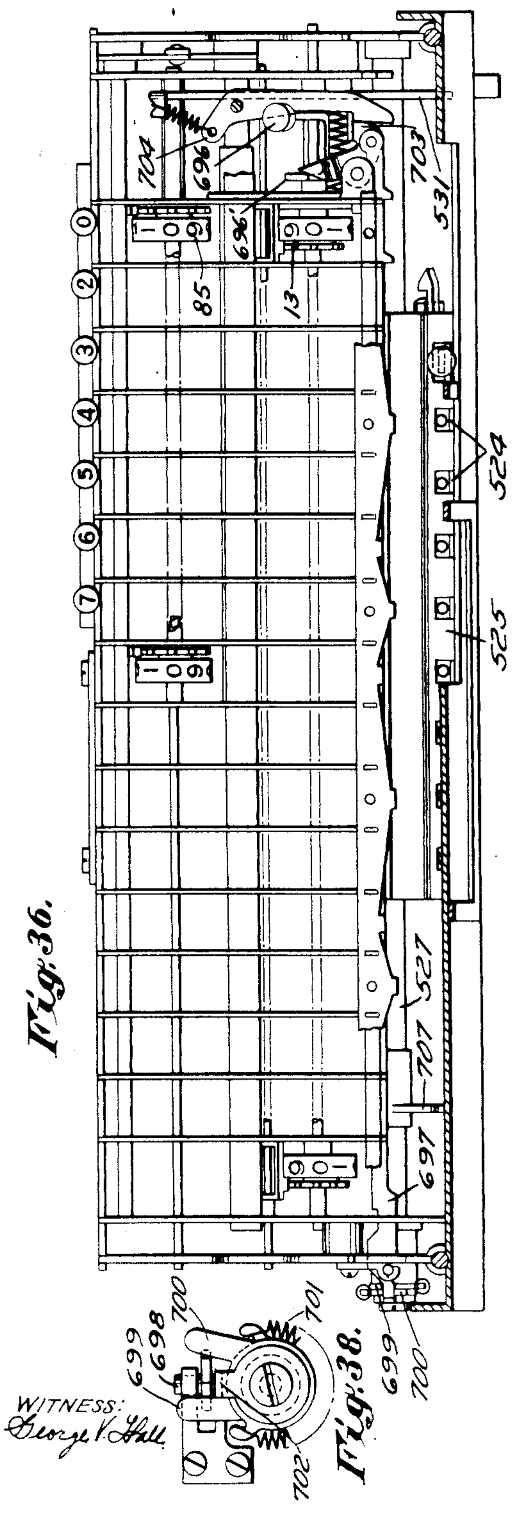
Figure 37:
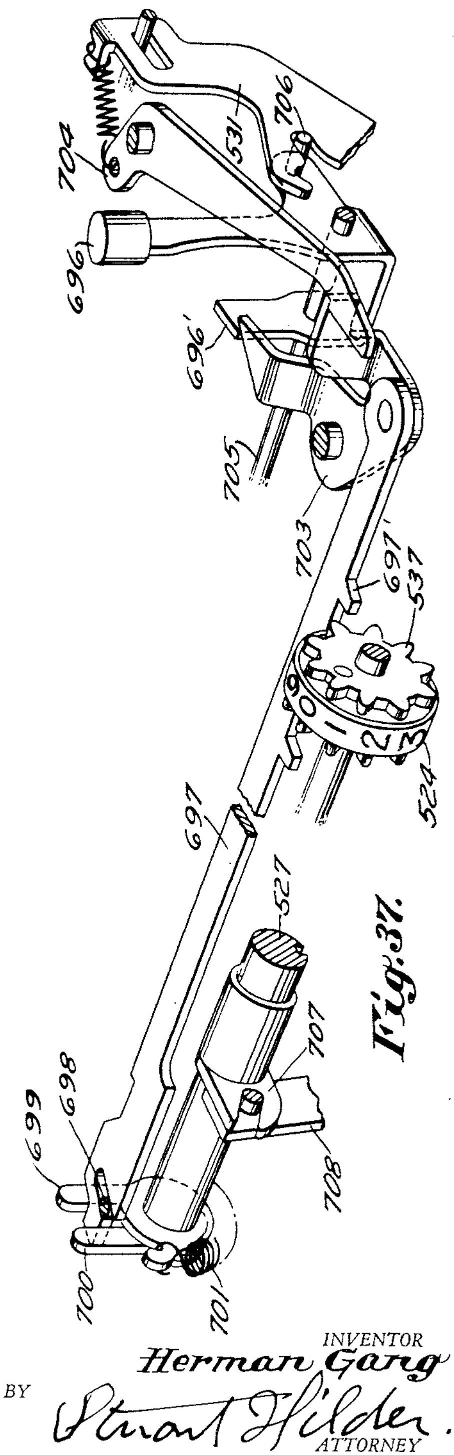
Figure 40:
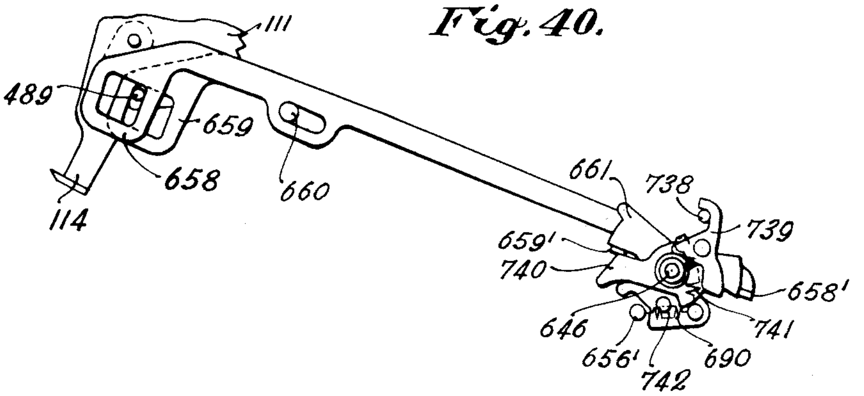
Figure 41:
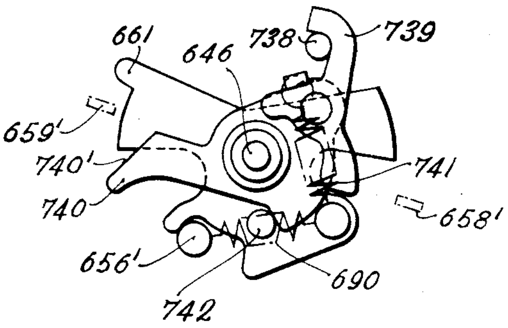
Figure 42:
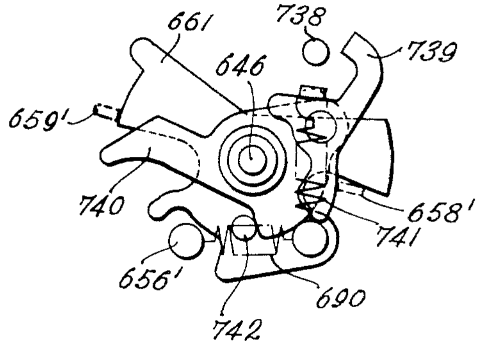
Figure 39:
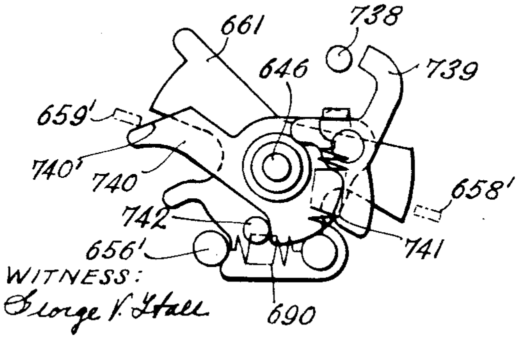

Fig. 29*a* is a detailed view of a multiplier storage device showing a twirler knob of the adjustment thereof;

Fig. 30 is a detailed side elevation of certain portions of the multiplication control mechanism in an operated position;

Fig. 31 is a view similar to Fig. 30 showing the parts in another operated position;

Fig. 32 is a fragmentary view of the parts shown in Figs. 30 and 31 showing the parts in another operated position;

Fig. 33 is a fragmentary plan view partly in section of the control links; control plate and parts associated therewith substantially as shown in Fig. 35;

Fig. 34 is an exploded perspective of the control links;

Fig. 35 is a fragmentary elevation showing certain portions of the control mechanism in an operated position during a program of multiplication;

Fig. 36 is a plan view of the main carriage; partially in section and showing the sub-carriage in an adjusted position;

Fig. 37 is a fragmentary perspective view showing certain parts of the constant multiplier mechanism;

Fig. 38 is a left end elevation of certain of the parts shown in Fig. 37 in an operated position;

Fig. 39 is an enlarged detailed elevation of the control plate and parts associated therewith as set on the initiation of a program of division;

Fig. 40 is an elevation of the parts shown in Fig. 39 with the control links showing the parts in an operated position;

Fig. 41 is an enlarged detailed elevation of the parts shown in Fig. 30 showing the parts in another position;

Fig. 42 is an enlarged detailed elevation of the parts shown in Fig. 30 showing the parts in still another operated position.

Figure 1:
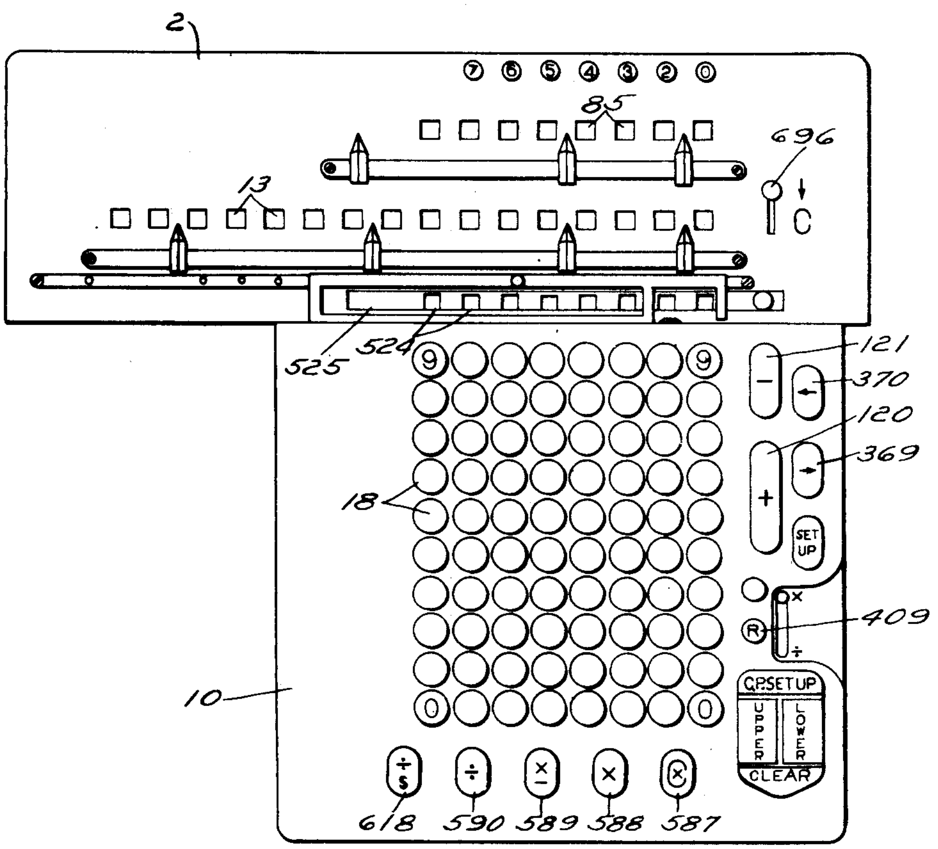
Fig. 1 is a plan view of a calculating machine built in accordance with the invention.

From an inspection of Fig. 1, it will be seen that the machine herein disclosed includes the usual keyboard 10 and a main carriage transversely shiftable relatively thereto. As will be noted, several of the control keys are grouped on the keyboard to facilitate simultaneous depression whereby to initiate certain machine operations hereinafter described.

Mounted in the main carriage are a product-dividend register comprising numeral wheels 13, multiplier quotient wheels 85 and a sub-carriage 525 longitudinally shiftable relatively thereto and including multiplier storage wheels 524.

*Registering mechanism*

Amounts set up on differential actuating gears 5 (Figs. 1, 2 and 3) by means of keys 18 and setting bails 19 are registered upon the numeral wheels 13 either additively or subtractively according to the direction of rotation of the actuator shaft 4 and the shaft 154 upon which the tens carry members 17 are mounted.

Differential gear shaft 4 and shaft 154 upon which the tens carry members are mounted are driven at a 1 to 1 ratio through a gear train (Figs. 7 and 8) comprising gears 403, 404, double gear 405, and gears 406, 407. Gear 407 is fast upon shaft 350 (Figs. 8 and 9) which is driven through friction clutch 352, the driving element of which is connected to the driving element of a second friction clutch 353 by a sleeve 354 so that they are rotated as a unit. The driving elements of the clutches 352 and 353 are connected to the output gear 408 (Figs. 9 and 11) of a differential gear drive from an electric motor 1 by means of a gear 355 secured to the driving member of the clutch 353. Clutch 352 is normally engaged and clutch 353 disengaged. However clutch 352 is disengaged and clutch 353 engaged to complete the drive to a carriage shift worm 358 as will be hereinafter described.

Normally the gearing comprising both working legs of the differential drive (Fig. 11) rotate idly as described in Patent No. 1,566,650; interruption of the movement of one leg causing the planet gears to move in their orbit in one direction accordingly rotating the output gear 408 and interruption of the movement of the other leg causing a movement in the opposite direction. The working legs of the differential drive are selectively arrested by means of a reversing clutch lever 111 fulcrumed on the frame at 112, and adapted for neutral, additive and subtractive setting. Clockwise movement of the clutch lever from neutral positions it to additive setting whereby a hook arm 114 of said lever will engage a lug upon gear 105 forming one leg of the differential drive and interrupt its rotation. Conversely, counterclockwise movement positions the lever 111 to subtractive setting whereby a hook arm 113 of said lever engages stop 110 for the other leg of the differential to interrupt its rotation and effect drive to the actuator 5 and tens carry members 17 in the reverse direction.

Locator cam 153 (Fig. 7) is fixed on shaft 350 which drives the gear train to the actuators. Upon rotation, the cam spreads the locator arms 422 thereby setting toggle 423 which will hold the arms out of contact with the locator cam during a registering operation.

Figures 3, 4, 5, 6:
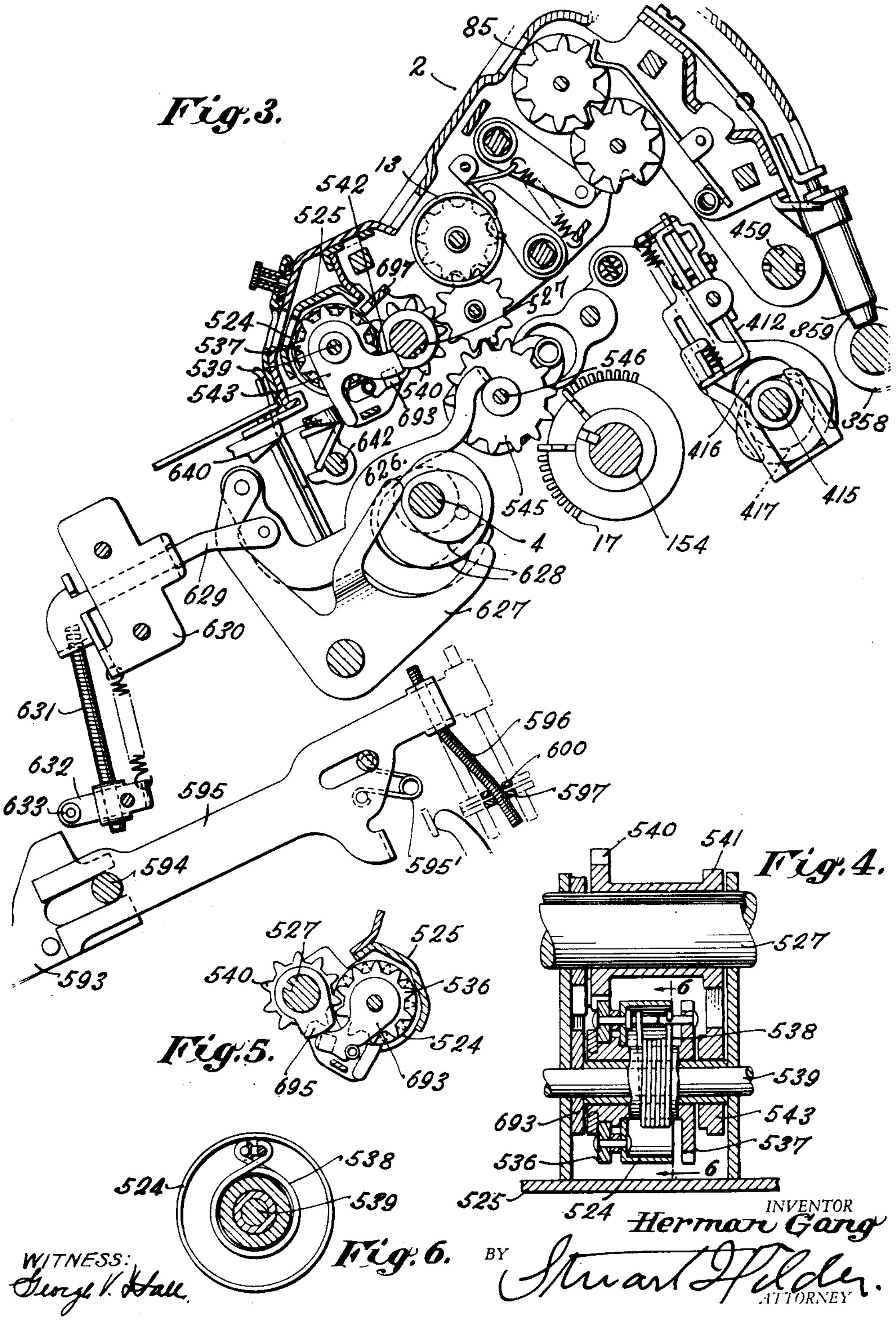
Fig. 3 is a vertical section through the main carriage showing the multiplier storage devices mounted therein, and the counting fingers for the storage devices and the multiplier quotient register.
Fig. 4 is an enlarged detailed horizontal section of one of the multiplier storage wheels and gears.
Fig. 5 is a vertical section through the subcarriage showing the pawls for holding the multiplier storage wheels and gears in adjusted position and cams for releasing the pawls.
Fig. 6 is a section taken on the line 6—6 of Fig. 4 showing one of the multipler storage wheels and the centralizing spring therefor.
Figure 7:
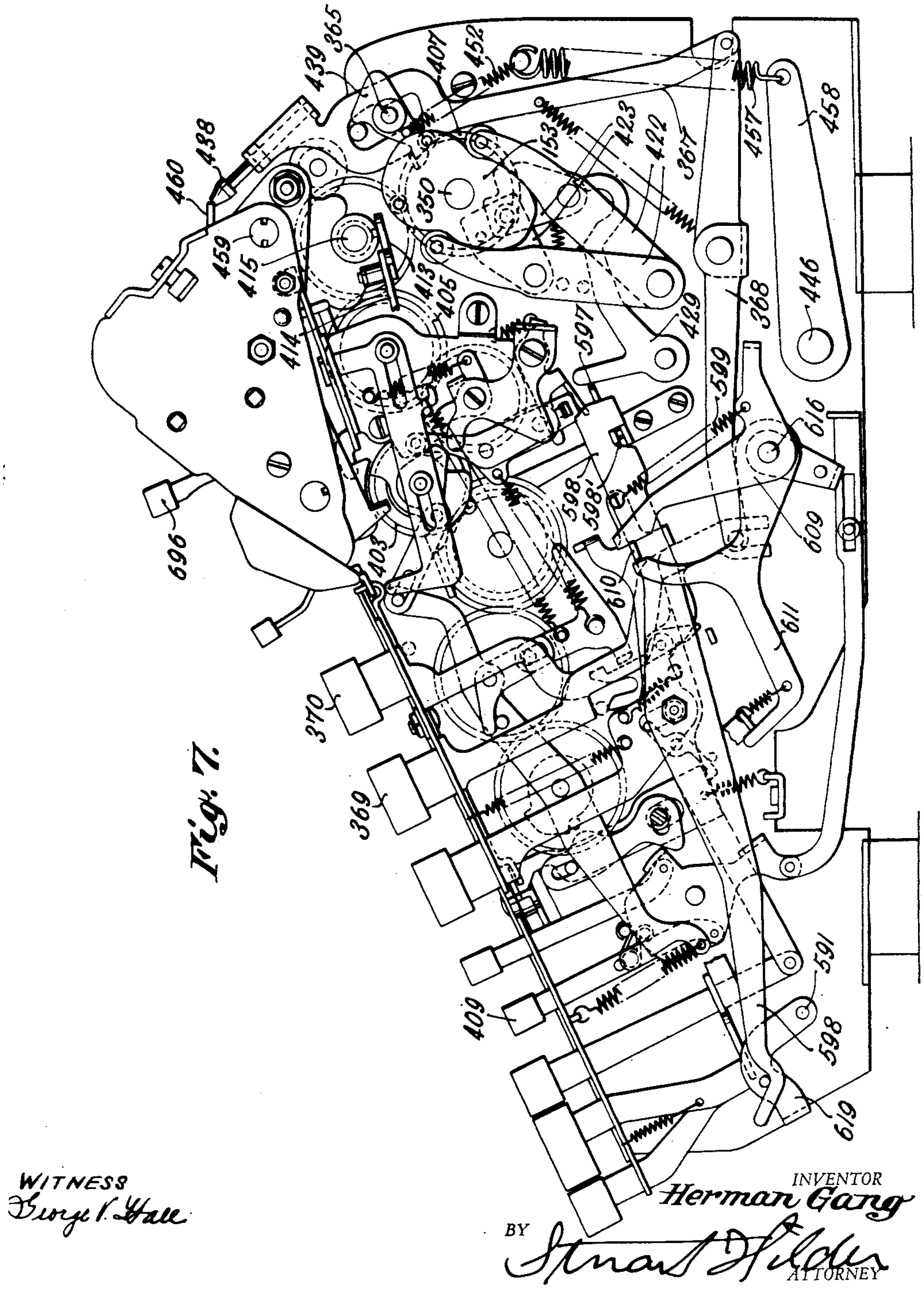
Fig. 7 is a right side elevation of the machine with the casing removed.
Figure 8:
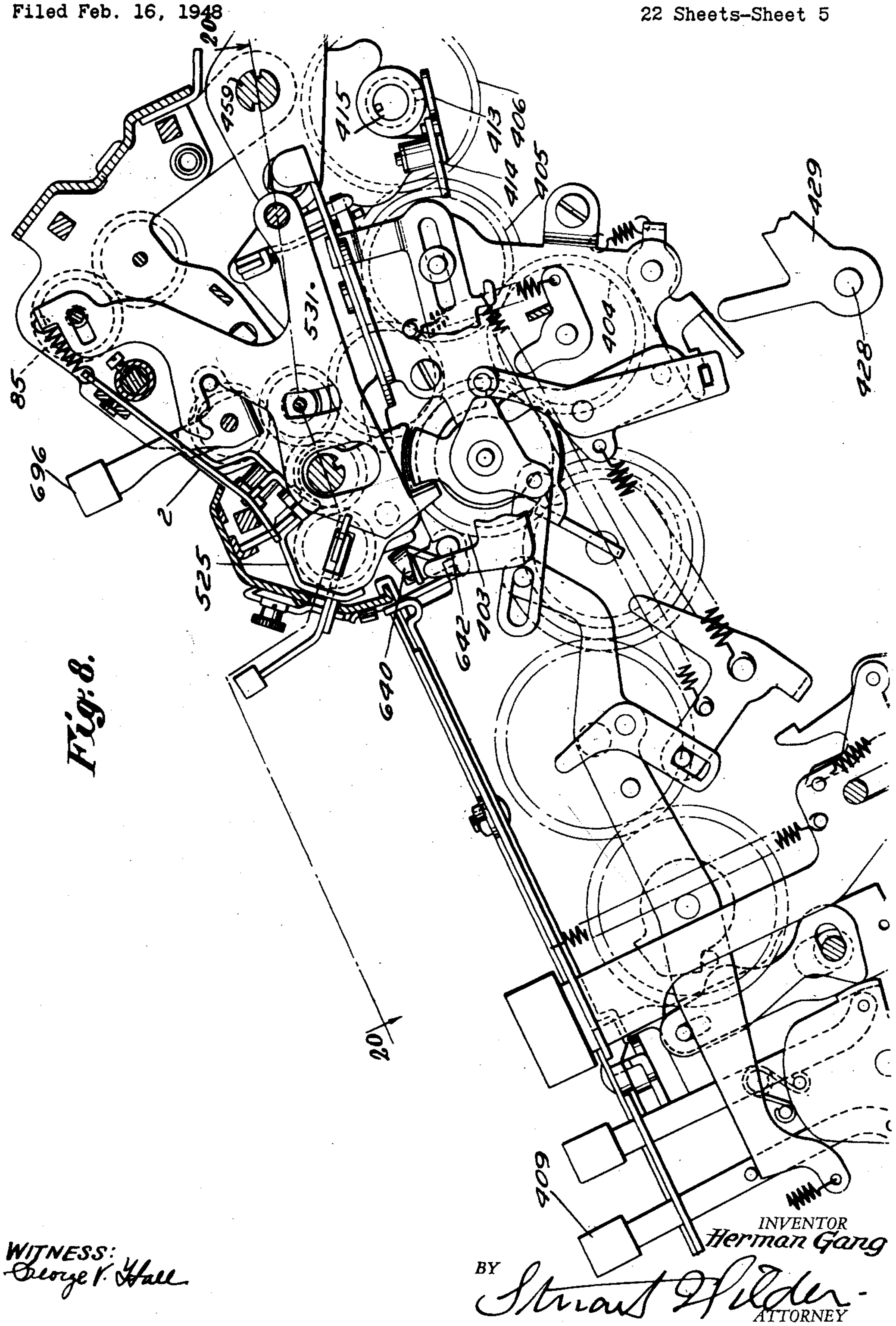
Fig. 8 is an enlarged detailed right side elevation with the main carriage in section.
Figures 12, 13:
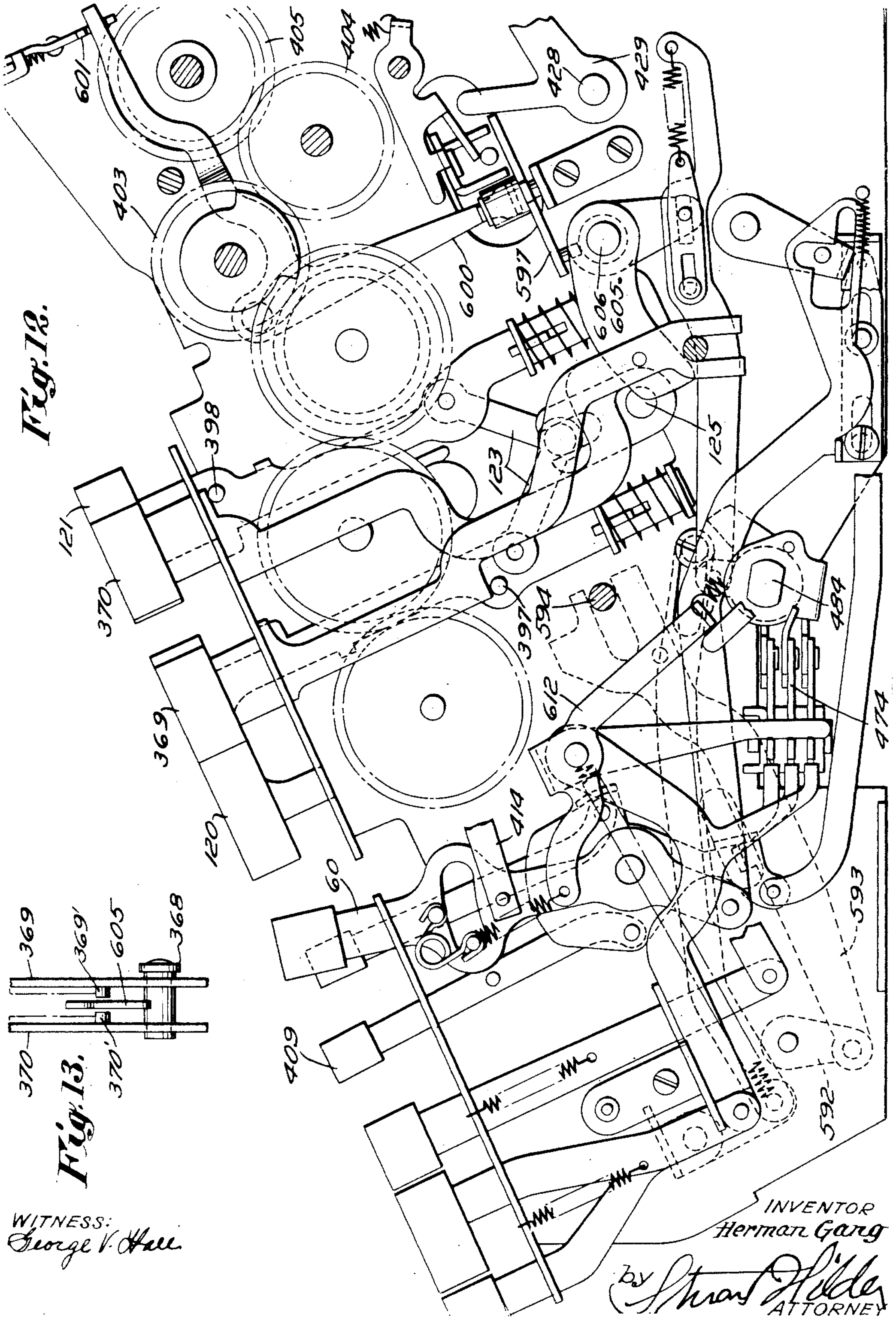
Fig. 12 is an enlarged right side elevation showing portions of the controls for the clearout mechanism and controls for the carriage return mechanism.
Fig. 13 is a detailed elevation of the carriage shift key stems as viewed from the left.

Registration is effected in the multiplier-quotient dials 85 by counting fingers 412, one of which is shown in Fig. 3. These fingers are operated substantially as set forth in Patent No. 2,273,237 to Edward C. Walters. By adjustment of the change lever 60 (Fig. 12), registration may be effected either like or unlike in arithmetical sign the registrations of the actuators. The change lever is connected to a bell crank 413 by link 414 (Figs. 7 and 12). The bell crank through pin engagement with a circumferential slot in a collar fixed on shaft 415 is adapted to move said shaft transversely of the machine to disengage and engage one or the other of the two cams 416 and 417 (Fig. 3) fixed on the shaft into driving relationship with the fingers 412. The shaft 415 is driven through a spline by gear 406 at a 1 to 1 ratio with the actuators.

*Plus and minus bar operation (repeat key set)*

With the repeat key 409 set (Figs. 1 and 7), registration is controlled by a plus bar 120 and a minus bar 121 (Figs. 1, 2, 11 and 12) as follows.

The bars have link connections 23 with a rock shaft 125 extending across the machine and provided with a setting plate 28 having spaced lugs 128' and adapted to engage an arm 130 of reversing clutch lever 111. Depression of the plus bar 120 will rock shaft 125 clockwise as viewed in Figs. 2 and 12 setting the clutch lever 111 from neutral into adding position, and depression of the minus bar 121 will effect opposite rocking of shaft 125 setting the clutch lever into subtracting position. Lever 111, in moving into either of its active positions is adapted to close the contacts of a circuit breaker interposed in the motor circuit by means of an arm 200.

Figures 9, 10:
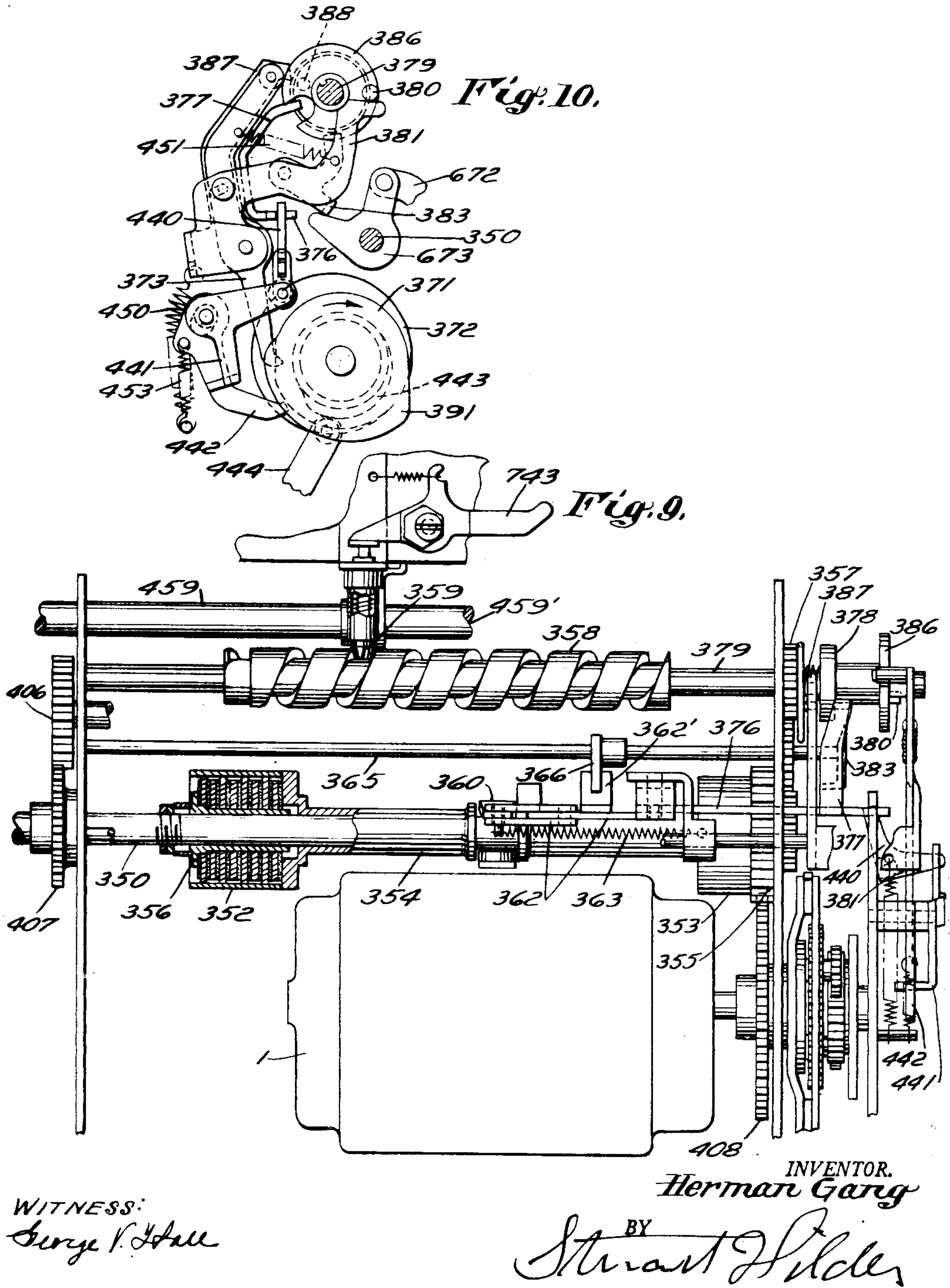
Fig. 9 is an elevation and partial section of portions of the carriage shift and actuator drive and control mechanism as viewed from the rear of the machine.
Fig. 10 is a detailed fragmentary left side elevation of portions of the carriage shift and actuator drive control mechanism.
Figure 11:
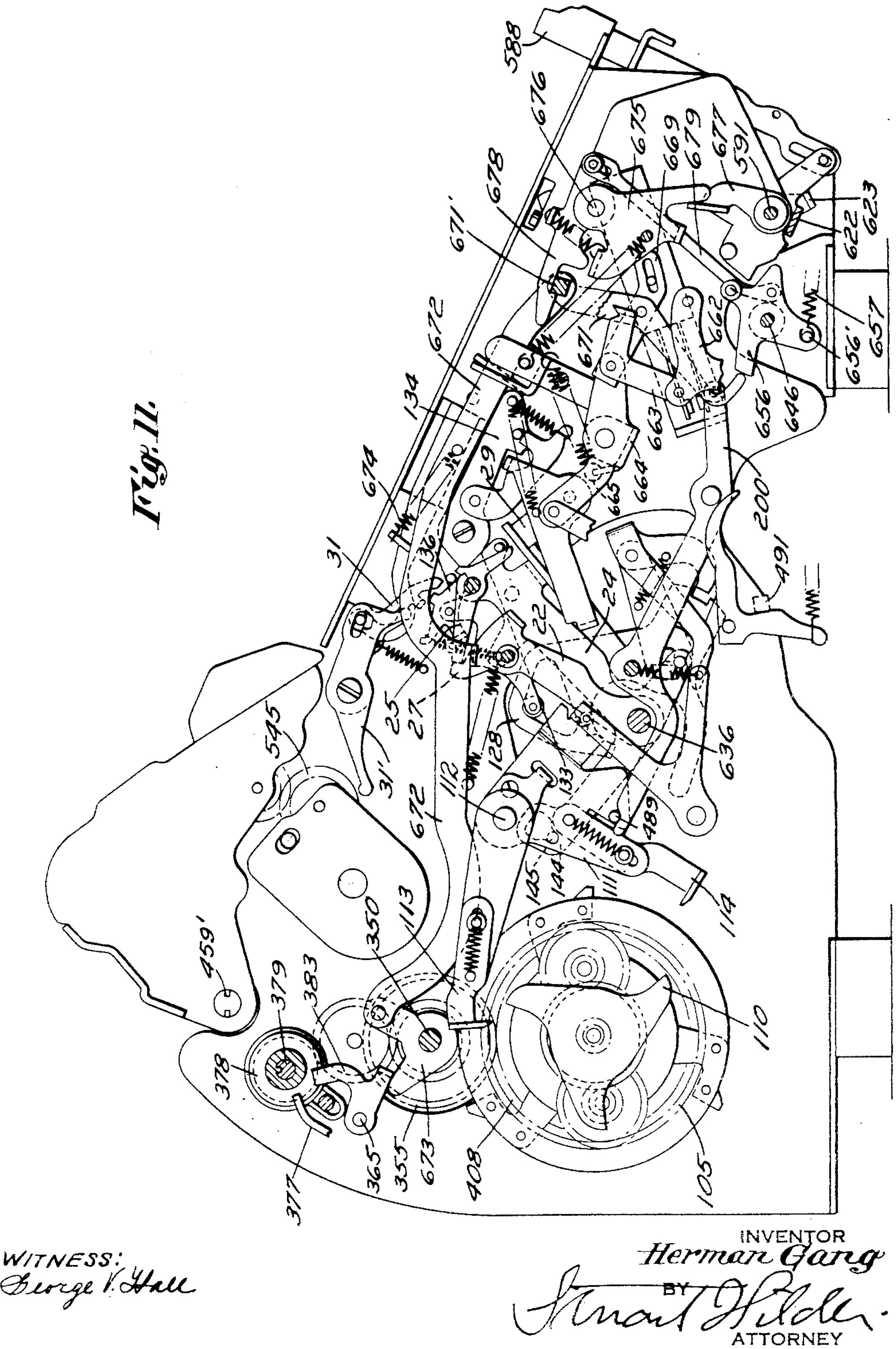
Fig. 11 is a left side elevation of the machine showing in part the differential drive mechanism and controls therefor.
Figures 14, 15:
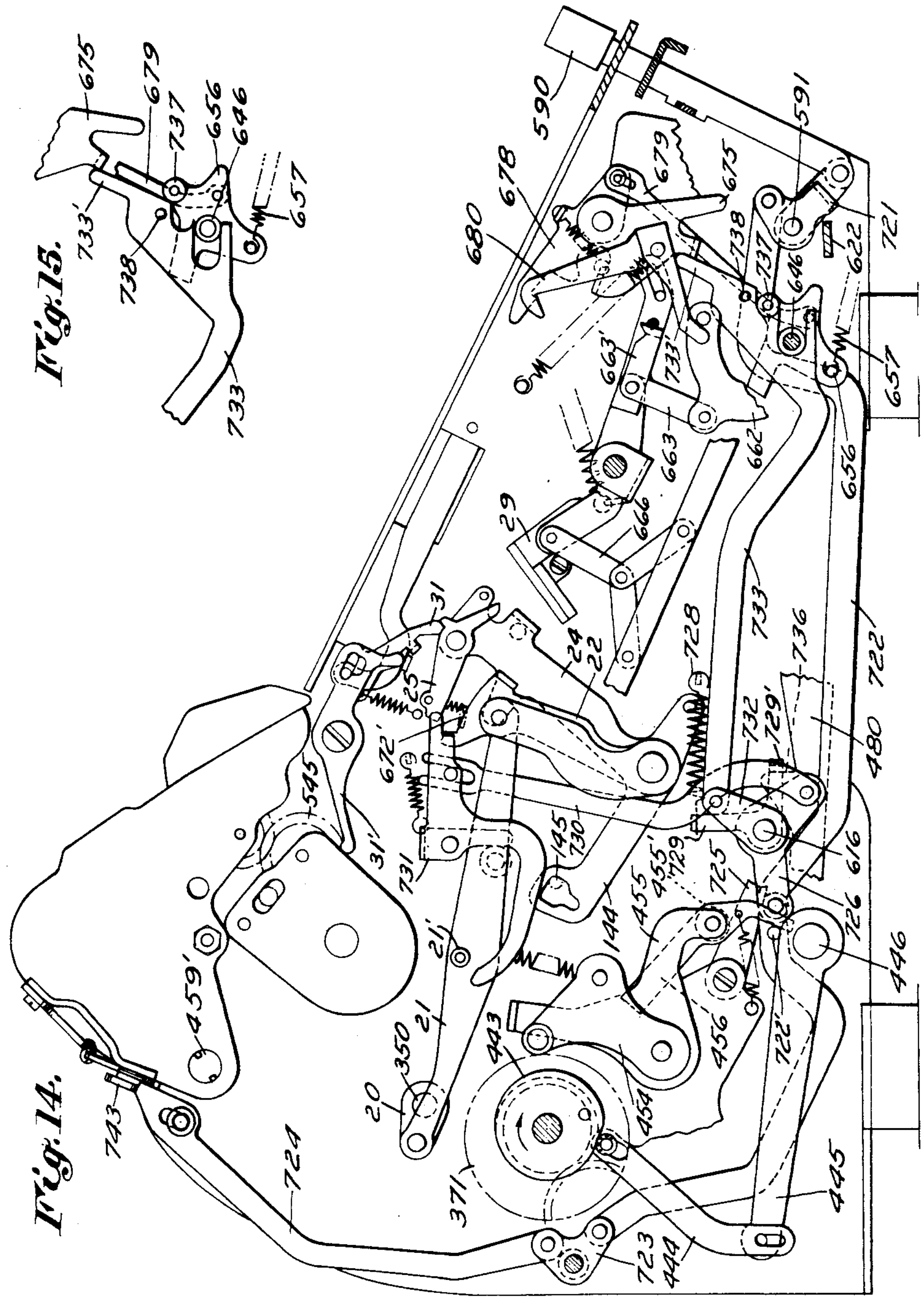
Fig. 14 is a left side elevation of the machine showing a portion of the means for raising the main carriage during a shift operation, and portions of the division control mechanism in an operated position.
Fig. 15 is a fragmentary view showing a portion of the division control mechanism in normal position.

Upon manual release of the plus bar 120 or minus bar 121 the parts will be brought to rest in full cycle position as follows:

Setting plate 128 is provided with opposed cam faces operating on the depression of either bar (Fig. 11), through a roller 133 to depress the rear end of a lever 134. This movement of lever 134 carries a pawl 136, mounted upon said lever into position beneath a trigger 31 normally engaging a pawl 25 mounted on the stop arm 24, and serving to hold said pawl inactive (Fig. 14). Upon release of the key suitable springs will return lever 134 to normal position, causing the pawl 136 to raise trigger 31 and release pawl 25, the latter dropping into position behind a shoulder 27 of rock arm 22, connected to shaft 350 by crank 20 and link 21. Shaft 350 is driven by friction clutch 352 (Fig. 9) and drives the actuators at a 1 to 1 ratio therewith through gearing 407, 406, etc., as heretofore described. Engagement of pawl 25 with shoulder 27 connects the arms 22 and 24 to operate in unison, the latter being carried against a fixed stop 29 to prevent further rotation of the parts in the original direction as shown in Fig. 11. Upon rebound of the parts from stop 29, a lug of pawl 25 will engage with the end of trigger 31 and lift said pawl out of engagement with shoulder 27.

In the movement of arm 24 against stop 29 a rearward extension 144 of said arm will engage a pin 145 of reversing clutch lever 111, and through the action of one or the other of the two opposed cam faces of said extension will move said lever to its neutral position.

Figures 16, 17:
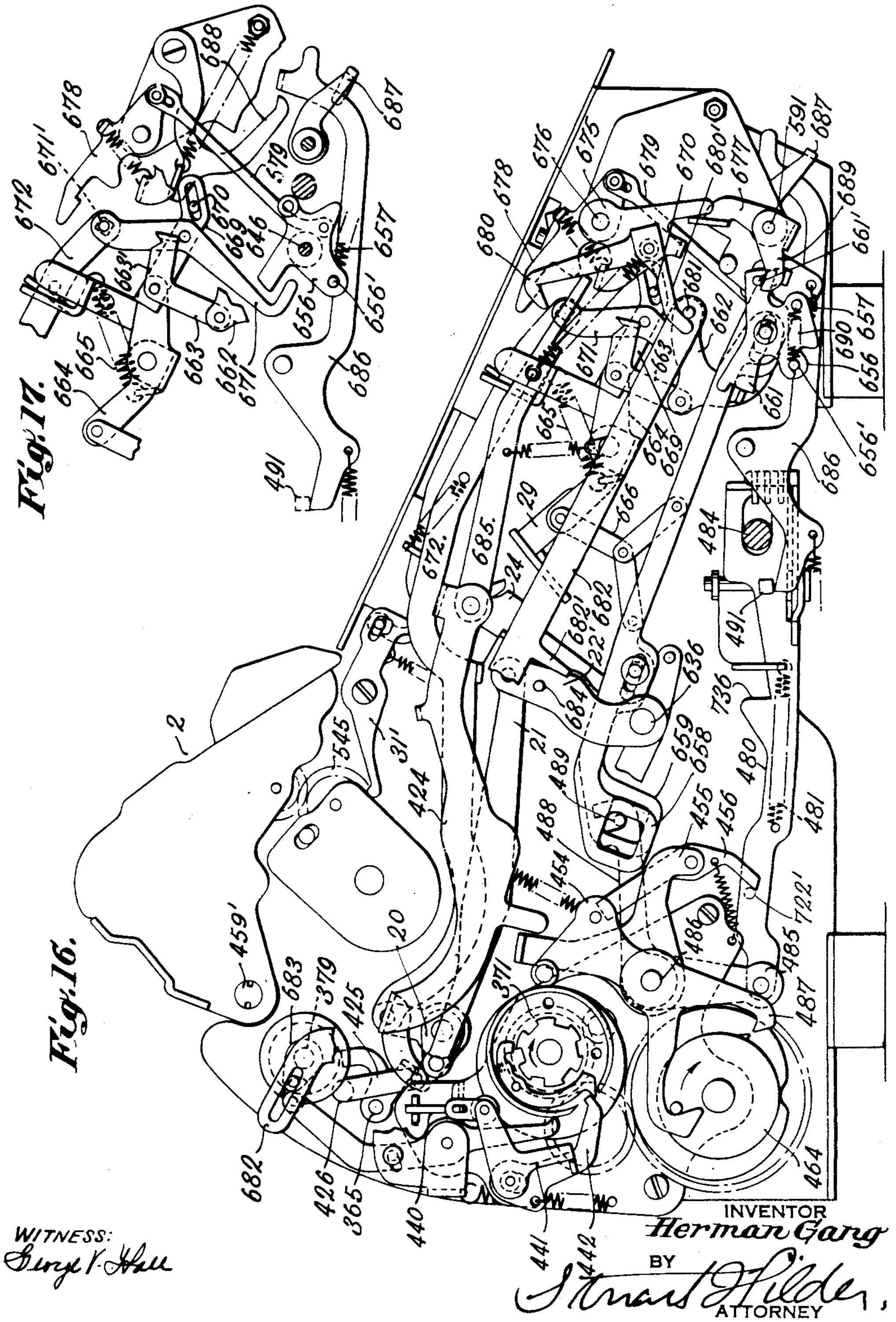
Fig. 16 is a left side elevation of the machine showing the clearout clutch and the two phase carriage shift control clutch, and the control mechanism in an operated position during a program of multiplication.
Fig. 17 is a fragmentary view showing certain parts associated with the mechanisms shown in Fig. 16.

Furthermore the movement of arm 24 against stop 29 will, through link 424, connecting said arm with arm 425, rock shaft 426 extending across the machine, in a counterclockwise direction as viewed in Fig. 16 (clockwise Fig. 18), and through suitable linkage 427 will rock shaft 428 counterclockwise. Fixed on shaft 428 is arm 429, a hook end of which is raised upon rocking of the shaft to contact a pin connecting the two links comprising the toggle 423 and break said toggle. Upon breaking of the toggle, the locator arms 422 are pulled inward against the cam 153 by a suitable spring and when arm 24 rebounds from the stop 29, the parts are located in full cycle position as shown in Fig. 7.

*Carriage shift mechanism*

The carriage shift devices herein disclosed embody the operational features substantially as set forth in Pat. No. 2,419,760 to E. F. Britten, Jr. However, means for lifting the carriage to partly unmesh the intermediate gears in the carriage and body of the machine for clearance prior to initiation of a shift, are included.

As herein disclosed and as set forth in the above mentioned patent, the means which control the extent and direction of actuator movement are utilized to control the extent and direction of shift of the carriage 2 (Fig. 1). For this purpose two friction clutches 352 and 353 are provided as shown in Fig. 9, the driving elements of these clutches being connected for rotation as a unit by a sleeve 354. The driving elements of clutches 352 and 353 are connected to the output gear 408 of the differential gear drive by means of a gear 355 secured to the driving member of clutch 353. The driven member of clutch 352 consists of a sleeve 356, fast upon shaft 350, a series of friction disks being interposed between the driving member of the clutch and the driven member 356. Normally clutch 352 is held engaged upon spring tension connecting the drive to the actuators to the output of the differential.

Clutch 353, which is normally disengaged, has a driven member similar to member 356 of clutch 352 except that it is freely supported on shaft 350 and is provided with gearing connection 357. The carriage is mounted at its ends and center on the aligned shafts 459 and 459' which are slidably and pivotally mounted in the framing of the machine. Worm 358 is engaged by a spring plunger 359 depending from carriage 2, the carriage thus being shifted to the right or to the left upon rotation of the worm 358 in one or the other direction.

Figure 2:
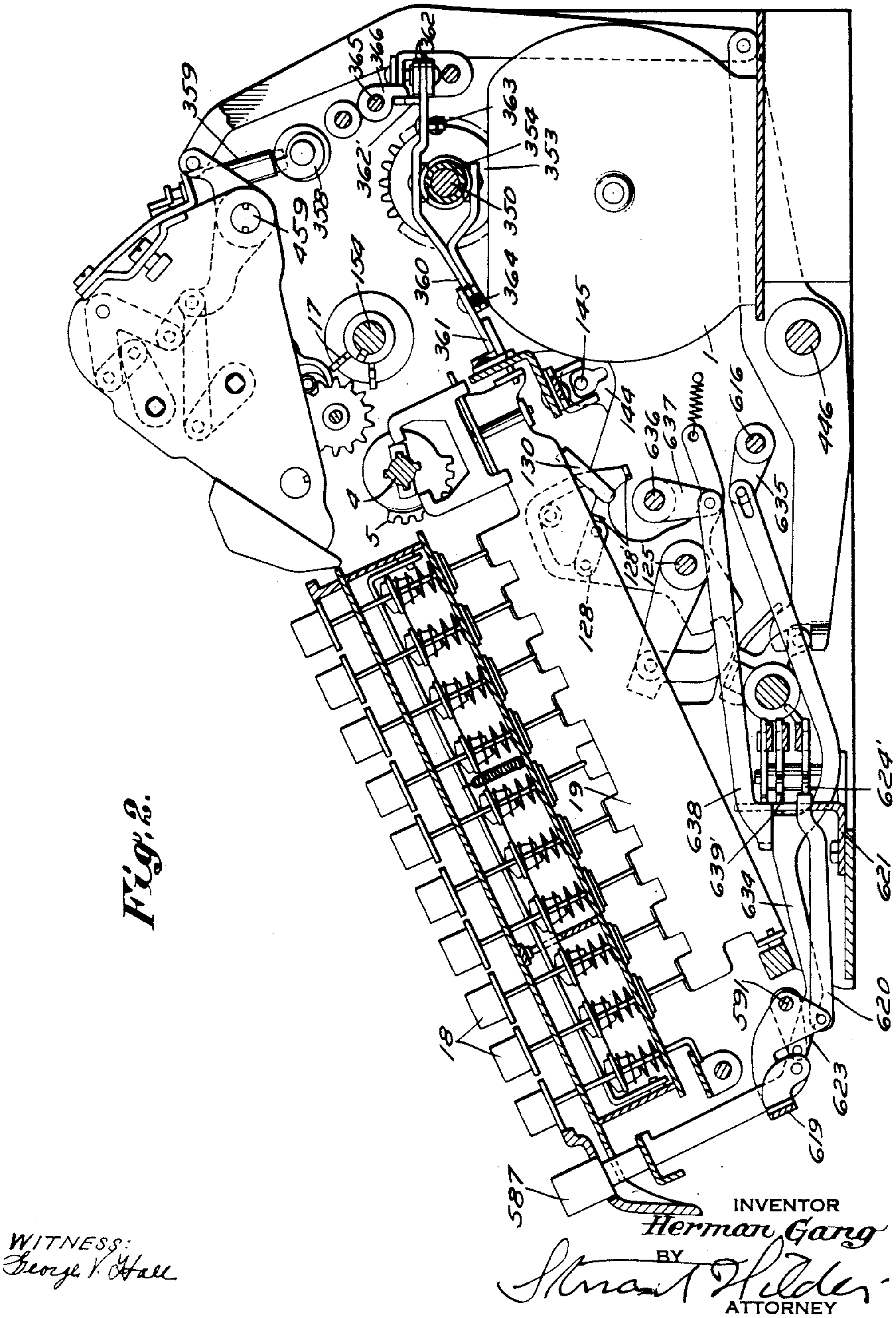
Fig. 2 is a vertical section showing the keyboard for selecting a value, and a portion of the carriage shift mechanism.
Figure 24:
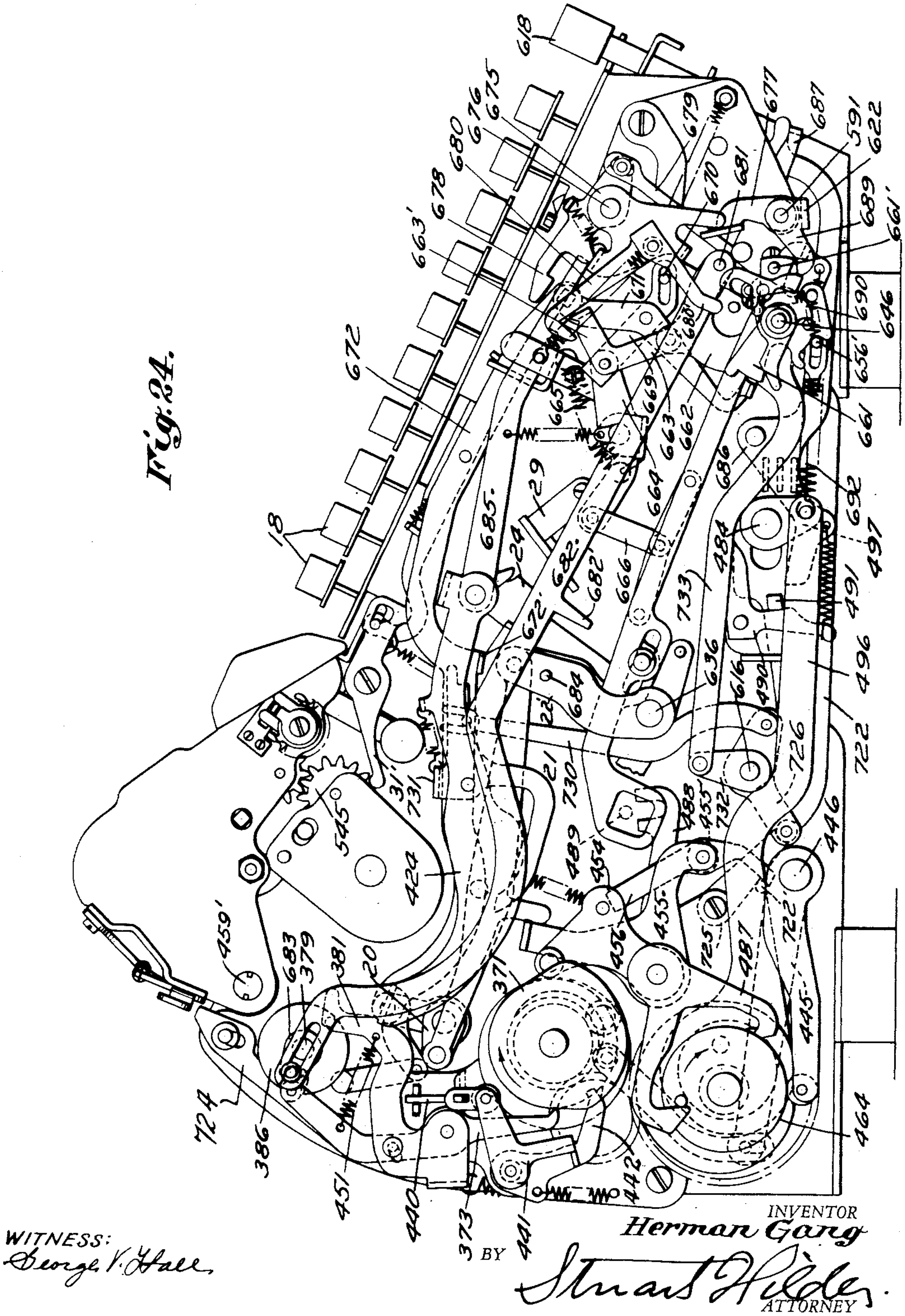
Fig. 24 is a left side elevation of the machine showing the various parts in their normal position.

Sleeve 354 is moved to the right or to the left, and is held under spring tension in either shifted position, to engage clutch 352 or clutch 353 by means of a toggle arrangement best shown in Figs. 2 and 9 and fully disclosed in the aforementioned Patent No. 2,419,760. A shifting arm 360 is provided with anti-friction rollers engaging between flanges of sleeve 354, and is pivoted at one end to a link 361, having pivotal connection to the machine framing, and at the other end has connection with one link of a toggle 362, the far end of this toggle being also pivotally secured to a bracket rigidly mounted on a fixed shaft extending between the side frames of the machine. In normal position of the parts toggle 362 is fully extended, holding arm 360 against the tension of spring 363 in position to engage clutch 352 in which position the clutch is yieldably held engaged under the tension of a spring 364 connected to link 361. In order to disengage clutch 352 and engage clutch 353, means are provided for breaking the toggle 362, thereby allowing a spring 363 to move sleeve 354 to the right as viewed in Fig. 9, in which position clutch 353 will be held engaged under tension of spring 363. For breaking the toggle, a shaft 365 is adapted to be rocked clockwise (Fig. 2) and is provided with a finger 366 which will unset the toggle through contact with a lug 362' thereof. Shaft 365 is rocked by depression of the right shift key 369 or left shift key 370 as follows:

These keys 369 and 370 are mounted in the machine frame closely adjacent to the plus bar 120 and minus bar 121 (Figs. 1 and 12). Right shift key 369 has a shoulder overlying a stud 397 carried by the stem of plus bar 120, and left shift key 370 has a shoulder overlying a stud 398 in the stem of minus bar 121, both keys extending downward and having slot and pin connection with a lever 368 (Figs. 7, 13, 18, 21). Pivotally mounted on the rear end of lever 368 and spring biased toward the front of the machine is arm 367 provided with a shoulder 367' (Figs. 17 and 21) and at the free end thereof a plunger 438 the function of which will be later described. Fixed on shaft 365 extending through the frame of the machine, is latch lever 439 the forward end of which is provided with a bent over portion normally overlying the shoulder 367' on latch arm 367 and a nose portion to the rear which acts as a stop by contact with shaft 426. Depression of the right shift key 369 will, therefore, effect depression of the plus bar 120, effecting additive drive from the differential to the driving members of friction clutches 352 and 353 and conversely negative drive from the differential will be effected by depression of the left shift key 370 which will effect depression of the minus bar 121. At the same time, depression of either of these shift keys will depress the forward end of lever 368 (Fig. 21) and raise its rearward end with the arm 367 attached thereto. This movement will rock lever 439 and shaft 365 clockwise by contact of shoulder 367' with the bent over portion of said lever, breaking the toggle 362 and engaging shift clutch 353 at which time clutch 352 is disengaged. Although drive to the shift worm 358 is thus effected, clutch 353 will slip momentarily and the worm 358 will be held locked against rotation while a one cycle clutch 371 (Figs. 16 and 24) makes a partial rotation comprising a relatively short step in the cycle to effect lifting of the carriage 2 to provide clearance during the shift as follows:

When toggle 362 is broken to initiate a shift, a link 376 connected to a crank extension of one of the toggle links will be moved to the right (Fig. 9). The end of the link has slot connection with the upper arm of a bell crank 440 the other arm of which has link connection to one arm of another bell crank 441 (Figs. 16 and 24). Depending arm of crank 441 is provided with a slot which engages a detent 442 which is spring urged to normally engage a pawl of clutch 371 holding it disengaged. The clutch is driven through suitable gearing by the electric motor 1. Upon movement of slide 376, the bell crank 440 will therefore be rocked and accordingly rock the bell crank 441 which will lift detent 442 against tension of spring 453 out of engagement with the pawl of clutch 371 to engage the drive. A second detent 373 normally rests against the periphery of the driven member of clutch 371 and has pin and slot connection with tripping arm 381. A spring 450 urges arm 381 counterclockwise and thus detent 373 in the same direction. An upwardly extending arm of the detent 373 is provided with a roller which normally engages a slot in the disk 386 secured to a sleeve which is splined to shaft 379 of the shifting worm 358. Thus the worm is held against rotation until the clutch 371 has rotated a distance which allows the detent 373 to engage the pawl of clutch 371 and interrupt the drive (Fig. 10). When the detent 373 moves inwardly to disengage the clutch 371, the upwardly extending arm of the detent disengages its roller from the slot in disk 386 permitting the engaged shift clutch 353 to drive the shifting worm 358.

Figure 25:
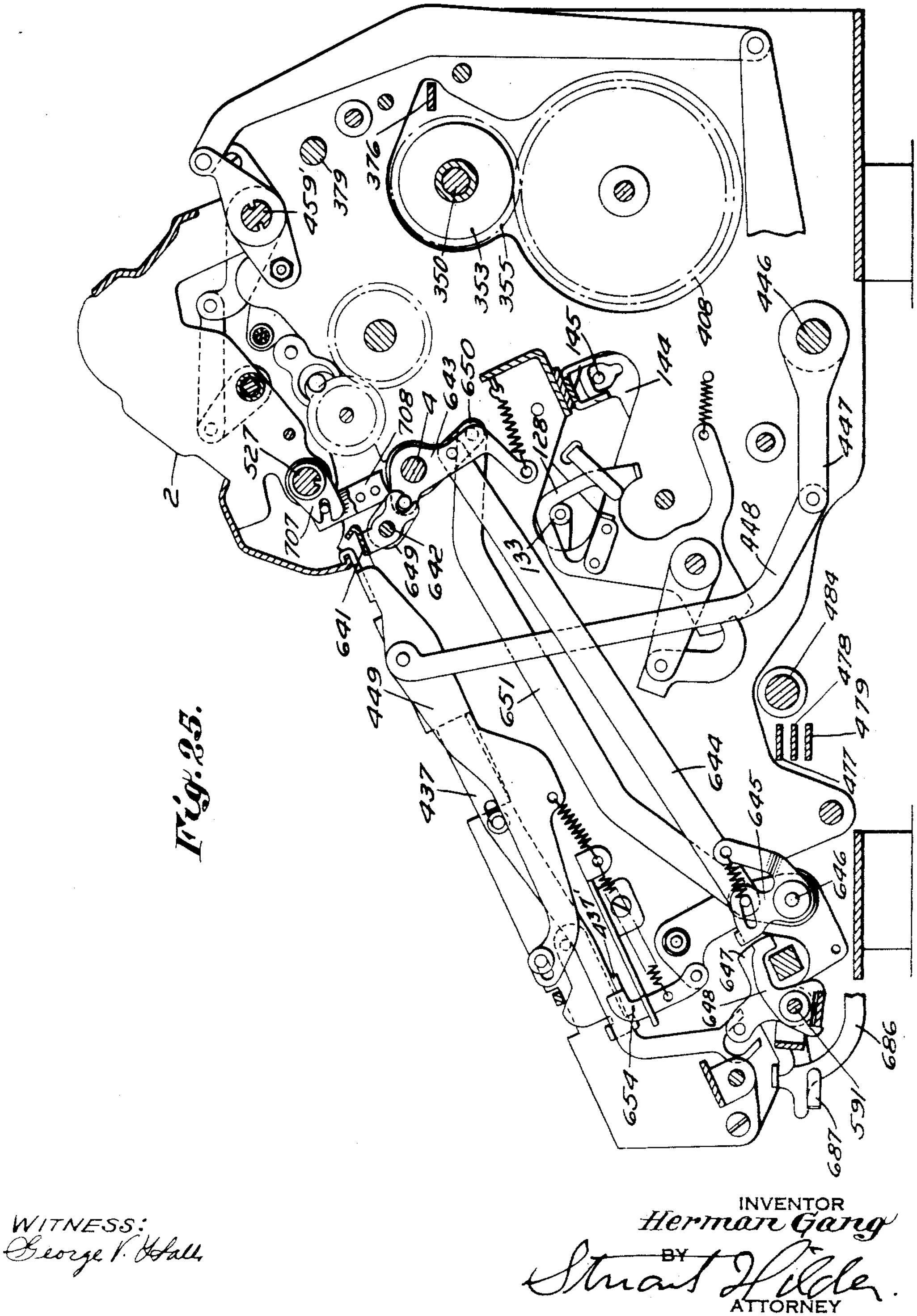
Fig. 25 is a vertical section taken just inside the left hand side frame of the machine and showing certain linkage for the clearout mechanism and portions of the multiplication control mechanism.

The above described step in the cycle of rotation of clutch 371 effects lifting of the carriage 2 through a cam 443 (Figs. 10 and 24) secured to the driven member of the clutch (Figs. 10 and 24). A link 444 provided with a roller at its upper end in contact with the cam 443 and guided by a slot in the framing of the machine (not shown) is moved downwardly by rotation of said cam (Fig. 10). Link 444 is attached through pin and slot connection to the end of arm 445 (Fig. 24) fixed on a shaft 446 extending across the machine. Downward movement of link 444 will thus rock shaft 446 counterclockwise (Fig. 24) and clockwise (Fig. 25) against the tension of a spring attached to arm 458 fixed on said shaft (Fig. 7). Fixed on shaft 446 are a pair of arms 447 (one of which is shown in Fig. 25) having link connections 448 with a pair of carriage lifters 449. The carriage lifters are provided with slots at their forward ends by which they are pivotally mounted on pins on the inner sides of the right and left side frames of the machine respectively. The rearward ends of the lifters 449 are provided with hook end portions adapted to fit under and over an inwardly turned shelf located at the front and extending the length of the carriage 2.

Rocking of shaft 446 will, therefore, raise arms 447 and through the link connections raise the carriage lifters thereby lifting the carriage pivotally mounted at its rear to partly unmesh the intermediate gears in the carriage from those in the body of the machine. As will be readily understood, the carriage will be in sliding engagement with the lifters during the shift at which time they perform the function of supports and guides. Also, it will be seen that the lift cam 443 is arrested in its rotation (Fig. 10) in position to hold the carriage in raised position during the shift which will be continuous as long as a shift key is held depressed or until the carriage has been shifted into either of its extreme positions as will be hereinafter described.

Release of shift key 369 or 370 will bring about the termination of the shift whereupon the one cycle clutch 371 will complete its cycle for the purpose of normalizing the several parts. To this end, when toggle 362 is broken to initiate a shift adjustment of the mechanism takes place as follows:

When toggle 362 is broken link 376 (Fig. 9) is moved to the right, as heretofore described, carrying an arm 377 integral therewith out of restraining engagement with a disk 378, fixed upon a sleeve which is splined to the shaft 379 of the shifting worm 358. A disk 386 secured to the opposite end of this sleeve is provided with a pin 380 (Figs. 10 and 24), normally lying to the left of a tripping arm 381, pivotally mounted on a common shaft with clutch detent 373. The detent 373 and tripping arm 381 have pin and slot connection and an upstanding arm of the detent and the tripping arm have attachment to the respective ends of a spring 451 which urges them one toward the other to the limit of the pin and slot connection. As heretofore described, the arm of the detent 373 has a roller which normally engages a slot in disk 386 and is removed therefrom when the detent acts to arrest the rotation of the clutch 371 following its engagement by lifting the detent 442 from engagement with the pawl of the clutch. A spring urges disk 378 and the associated parts toward the right (Fig. 9), but the disk is restrained, after the removal of the restraint of arm 377 by engagement with a crank arm 383, more clearly shown in Fig. 11. Crank arm 383 is secured upon shift initiating shaft 365 which is rocked upon depression of a shift key and thus rocks the arm 383 into path of movement of the disk 378. As movement of the disks 378 and 386 to the right act to terminate the shift, restraining crank arm 383 provides for continuous shifting until the carriage has reached its extreme position or until the shift key is released.

Upon release of the shift key, shaft 365 will be restored by counterclockwise rotation of lever 439 (Fig. 7), under the influence of spring 452, thereby removing crank 383 from the path of disk 378. Spring urged disk 378 will now move to the right as viewed in Fig. 9, and with it disk 386 and pin 380 until blocked by contact with tripping arm 381. As shaft 379 of worm 358 completes its cycle of operation, pin 380 will contact one of the two opposed cam faces of tripping arm 381 (Fig. 10) rocking said arm clockwise against the tension of spring 450 and putting detent 373 under tension of spring 451 thereby biasing the roller of the arm of said detent against the perifery of disk 386. This relative movement between the tripping arm 381 and detent 373 is allowed by the pin and slot connection therebetween. As this movement reaches its maximum, the shift worm reaches its full cycle position at which time the slot in disk 386 is in registration with the roller on the arm of detent 373 and said roller is urged to enter the slot by tensioned spring 451. In order to insure this action and prevent the worm from running past full cycle position, tripping arm 381 is provided with an extension 387 (Figs. 9 and 10). When the tripping arm is moved by pin 380, the extension 387 is moved into the path of a pin 388, which is fixed in a disk rotating with shaft 379, thereby preventing movement of the shaft beyond full cycle position. As the shaft may be rotating in either direction, pin 388 may engage extension 387 on either side thereof, for which reason the disk to which pin 388 is fixed has pin and slot lost motion driving connection with gear 357, fast on shaft 379. When the roller on the arm of detent 373 enters the slot in disk 386, said detent is removed from engagement with the pawl of clutch 371 permitting the reengagement of the clutch to complete its cycle of operation to normalize the several parts. In this connection, it will be noted that the toggle 362 must be reset to disengage the friction clutch 353 and engage clutch 352 and that the clutch lever 111 (Fig. 11) must be disengaged. Also the carriage must be lowered to its normal position. Furthermore, it will be observed that, although the plus or minus bar is depressed and released with the shift key, arm 22 will not rock during a shifting operation, and therefore the tripping of the trigger 31, as the plus or minus bar is released, will be ineffective. Disengagement of clutch lever 111, lowering of the carriage and resetting of toggle 362 is accomplished by the clutch 371 as follows:

The clutch 371 is provided with cams 372 and 391 secured to the driven member of said clutch. Upon rotation of clutch 371 in its second step of movement, cam 391 (Fig. 10) will engage a roller on an arm of bell crank 441 rocking the crank counterclockwise, thereby through the link connection rocking bell crank 440 counterclockwise (Fig. 9) to move the slide 376 to the left and reset the toggle 362. Also detent 442 will now be urged inwardly by spring 453. When slide 376 is moved to the left, disk 386 and pin 380 are removed from engagement with tripping arm 381 allowing the arm to be rocked counterclockwise by spring 450 urging detent 373 through the pin and slot connection against the perifery of the driven member of the clutch 371. In this connection it will be noted, that the roller on the arm of the detent 373 will be moved outward from the bottom of the slot in disk 386 but not removed, thus holding the shift worm 358 in locked full cycle position (Fig. 24). During this second step of rotation of the clutch 371, the clutch lever 111 will be restored to its neutral position by operation of cam 372. To this end, arm 454 (Figs. 16 and 18) pivotally mounted to the frame of the machine, is provided with a roller held in contact with cam 372 by action of a spring attached to said arm. A second arm 455 having common pivotal mounting with arm 454 is provided with a latch the upstanding end of which is normally in the path of movement of a pin in arm 454 so that arm 455 will be rocked in unison with arm 454. Arm 455 will, therefore, be rocked clockwise (Figs. 16 and 24) upon rotation of clutch 371 in its second step of movement. An upstanding extension of arm 455 will thus contact a lug on link 424 attached to the full cycle arm 24 at its forward end, and move the link toward the front of the machine thus rocking arm 24 clockwise about its pivot, raising the cam extension 144 (Fig. 11) into contact with the pin 145 of clutch lever 111, and thereby centralizing the clutch lever. At this point, it will be noted that the circuit breaker to the motor has been broken, and although clutch 371 has not yet reached its full cycle position, cams 372 and 391 have completed their work and the clutch through momentum will be free to coast to the completion of its cycle where the drive will be disengaged by detent 442. Also, clutch 353 is still in engagement when the shift worm 358 is stopped and therefore a momentary slippage of the clutch will take place as toggle 362 is being reset. Furthermore, as the clutch 371 completes its cycle of operation it will be seen that the cam 443 will allow the carriage 2 to be lowered to its normal position under the urge of spring 457 (Fig. 7).

Figures 18, 19:
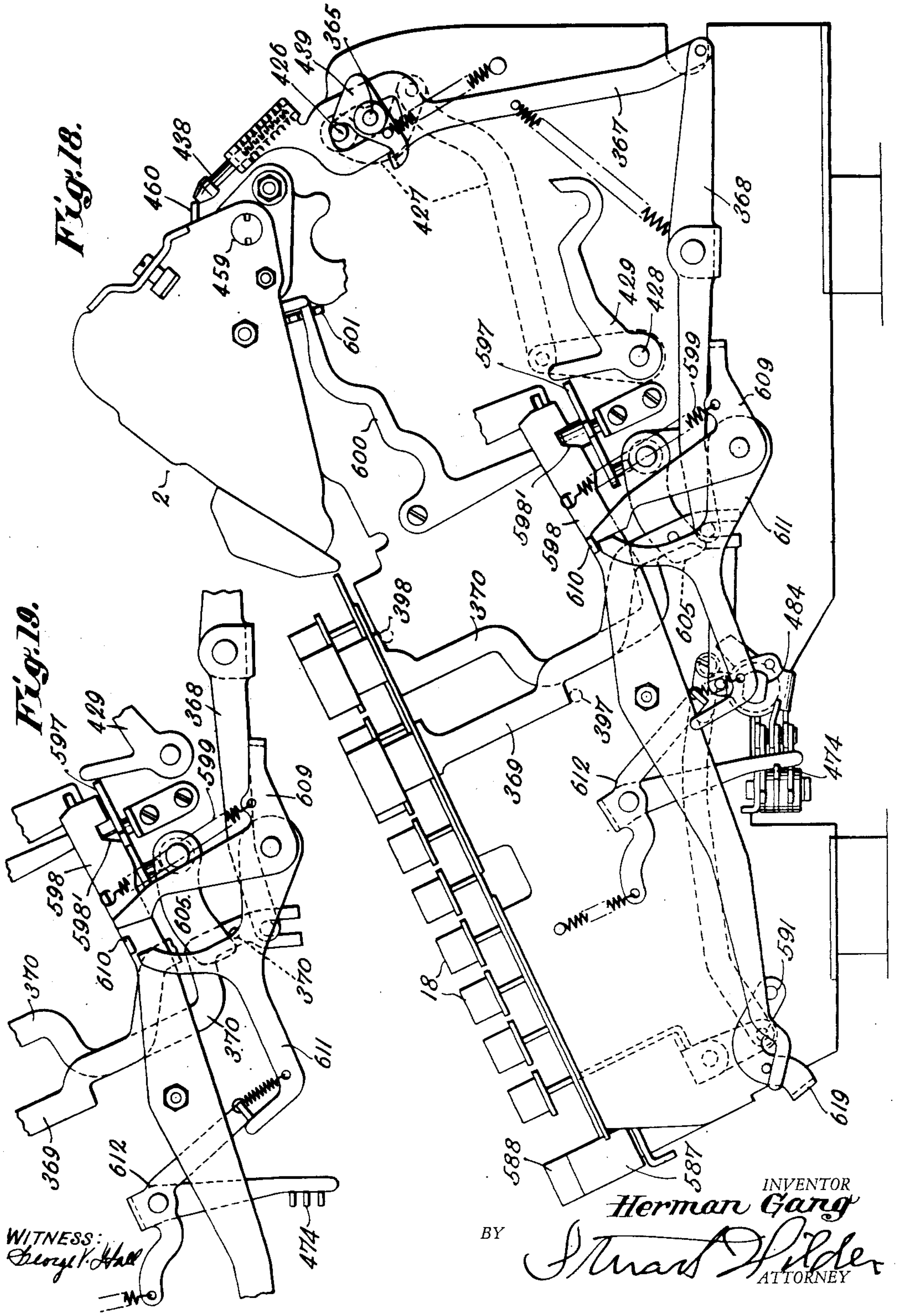
Fig. 18 is a right side elevation of the machine showing portions of the carriage return control devices in an operated position.
Fig. 19 is a fragmentary side elevation of certain of the parts shown in Fig. 18 in another operated position.

Should the right shift key 369 or left shift key 370 be held depressed until the carriage is shifted into either of its extreme positions, shift initiating shaft 365 will be restored to normal whereby the drive is terminated in the same manner as described when the shaft 365 is restored to normal by release of the shift key. For this purpose, two lugs 460 (Figs. 18, 21, 22, 23) are located on the rear of the carriage and so spaced that the nose of a plunger 438 mounted on arm 367 is positioned just below one or the other of the lugs when the carriage is in either of its extreme shifted positions. Should the carriage be in the extreme right hand position for example and the left shift key be depressed (Fig. 21), the plunger which is spring urged to its normal position (Fig. 18) will be depressed by contact with the lug 460 when arm 367 is raised and the shift initiated. When the carriage has shifted from the extreme right hand position, the lug 460 will be removed from contact with the plunger 438 and said plunger will be spring urged to its extended position. As the carriage is shifted into the extreme left hand position, the nose of the plunger will ride outward on the inclined edge 460′ of the lug 460 thus moving arm 367 to the rear against the tension of its spring (Fig. 22). This movement of arm 367 will remove shoulder 367′ from restraining engagement with latch lever 439 allowing the lever and shaft 365 to be spring urged counterclockwise to normal and thus terminate the shift. When the shift key is finally released, the plunger 438 will drop below lug 460 and arm 367 will be urged forward by its spring, locating the shoulder 367′ in its normal position below the forward end of latch lever 439 (Fig. 18). Termination of the shift at the extreme position in the opposite direction is, as will be readily understood, accomplished in the same manner. Should a shift key be depressed while the carriage is in the extreme position of the indicated shift, a shift will be initiated but as the plunger 359 is at the end of the worm 358 the drive will be ineffective to move the carriage. However, the plunger 359 which is spring urged within the groove of the worm 358 will be raised to ride over the outer diameter of the worm by the eccentric conformation of the worm at either end, as will be seen in Figs. 2, 9 and 20. This action is utilized for a purpose hereinafter described.

*Multiplication*

The machine herein disclosed provides for plus or minus multiplication: the plus operation being initiated by either of keys 587 or 588 (Figs. 1 and 28) and the minus operation by key 589. Carriage 2 is shifted toward the right during a calculation.

In my co-pending application Serial No. 57 943, filed on November 2, 1948, sub-carriage 525 is manually shiftable relative to the main carriage 2 in the performance of certain operations therein disclosed. However, as these operations form no part of the present disclosure, it will be readily seen from the following description that storage wheels 524, gears 540 and their associated parts may be mounted directly in the main carriage 2.

The multiplier storage wheels 524, one for each order of the keyboard, as herein shown, are located at the front of the sub-carriage 525 and are fixed to gears 536 to the left thereof (Figs. 4 and 20) by suitable rivets. The wheels 524 and gears 536 are rotatably mounted as units on sleeves provided with gears 537 integral therewith and located to the right of said wheels, the gears 537 having yieldable spring connection 538 with wheels 524. Gears 536, wheels 524 and gears 537 are normally adapted, however, to be rotated as units on the shaft 539 extending the length of the sub-carriage 525. Located to the rear and in constant mesh with the gears 536 are the multiplier storage gears 540 which are rotatably mounted on the splined shaft 527 which extends between the end plates of carriage 2. The gears 540 are provided with rightwardly extending hubs 541 (Figs. 4 and 20) terminating in end portions of slightly larger diameter. The hubs 541 are provided with recesses 542 (Figs. 3 and 29) which are adapted for registration with fingers 543 which are rotatably mounted on the shaft 539. When a value is set in a storage gear 540 (for instance by means of the knurled disk 711, (Fig. 29a), the cooperating finger 543 will ride on the perifery of its hub 541, and when the storage gear is counted back to zero, as will hereinafter be described, the finger will be urged into the recess 542.

Multiplier key 588 (Fig. 28) has slotted connection with a pin 622′ fixed in a forwardly extending arm of a bail 622. Bail 622 is pivotally mounted on shaft 591 and the arm thereof, as indicated by the dot-dash lines in Fig. 28 and more clearly seen in Fig. 11, overlies a lug of a crank 623 which is fixed on shaft 591. A crank 592, fixed upon shaft 591, has pivotal connection with a slide 593, said slide being supported at its rear end upon a stud 594, fixed in the machine framing. Upon rocking of shaft 591 by key 588, slide 593 will be moved rearwardly.

The normally ineffective counting finger 626 (Fig. 3) for the multiplier storage gears 540 is rendered effective upon setting of slide 593 to its rearward position. The finger is driven by a rocker 627 which is pivotally mounted on a stud on the inner face of the right hand frame. The rocker is provided with a forked extension which is engaged by a positive action cam 628 fixed on the digital actuator shaft 4, adjacent the inner face of the right hand side frame. Thus rocker 627 is given a reciprocatory movement at a one to one ratio with the machine actuators. Rocker 627 is provided with an upstanding arm at the top of which is pivotally mounted the upwardly turned forward end of the counting finger 626. The rear end of a link 629 is pivotally attached to finger 626 below the pivot of said finger on the arm of rocker 627 and said link is slidably supported in a bracket 630 mounted on the inner face of the right hand side frame. The top of a tightly wound spring 631 is attached to the forward end of link 629 and the bottom of the spring is mounted on a lever 632 to the left (Fig. 3) of the fulcrum of said lever on the inner face of the right hand side frame. Lever 632 is provided with a roller 633 at its forward end and a spring attached to the rearward end thereof biases it in a counterclockwise direction.

Normally upon operation of rocker 627, counting finger 626 is moved idly forward and back again in a straight line to the position shown in Fig. 3. During this action, the finger is urged downwardly by link 629 and rests upon a bushing on shaft 4 and out of engagement with storage gear 540. Link 629 urges finger 626 downwardly as it is moved toward the front of the machine by spring 631, lever 632 being rocked counterclockwise by the spring.

When slide 593 is moved to the rear, the rear end thereof is moved beneath roller 633 of lever 632, thus blocking said lever from counterclockwise movement. Accordingly when rocker 627 is operated, link 629, being at first held from forward movement by spring 631, will effect movement of finger 626 counterclockwise about its pivot on the arm of rocker 627, until the rearward end of said finger is raised into contact with storage gear 540. As shown by the dotted lines in Fig. 3, the rearward and free end of finger 626 is bent inwardly at right angles to engage a tooth of gear 540. Further counterclockwise movement of the counting finger being prevented by gear 540, further movement of rocker 627 in a counterclockwise direction will move finger 626 toward the front of the machine against the tension of spring 631 thus rotating gear 540 clockwise one tooth. As rocker 627 is moved clockwise in its return movement, finger 626 will be moved toward the rear and will ratchet past the tooth to the rear on gear 540 since the rear face of the engaging portion of the finger is beveled and since the gear is restrained by a click pawl 693. As the cycle is completed and link 629 reaches the limit of its rearward travel, finger 626 is moved clockwise by said link to its normal position as shown in Fig. 3. From an inspection of cam 628 it will be apparent that the action of the counting finger will be the same for the rotation of actuator shaft 4 in either direction. Furthermore, it will be understood that when carriage 2 is in the extreme left hand position, the rightmost storage gear 540 will be in position for engagement by counting finger 626, and that when the carriage 2 is shifted from order to order the respective gears 540 will be brought into position.

The actuation, carriage shift and stopping of the machine is controlled by bails 640 and 641 (Figs. 3, 8, 25, 29 and 30). The bails are mounted on a shaft 642 extending between the side frames of the machine, and are located just below the forward edge of carriage 2. Bail 640 is fixed on shaft 642 and bail 641 is pivotally mounted thereon as best seen in Fig. 29. Bail 640 is operated in connection with the finger 543 of the multiplier storage wheel 524 and gear 540 of the order which is in alignment with the units order of the keyboard and thus is in position to be counted out by counting finger 626 (Fig. 3). It will be noted that when the related storage wheel is not in zero registering position bail 640 is held in a counterclockwise position by finger 543 and that an extension to the left of bail 640 by contact with a pin 641' (Fig. 29) at the right hand end of bail 641, likewise holds that bail in counterclockwise position. Bail 641 extends to the left from bail 640 and is adapted to operate in connection with the fingers 543 of all of storage wheels 524 and gears 540 of the orders to the left of bail 640. As will be described in detail later, when storage gear 540 is counted back to zero finger 543 will permit clockwise movement of bail 640. However, if there is a value in any one of the higher orders of gears 540, the associated finger 543 will prevent clockwise movement of bail 641. Thus clockwise movement of bail 640 will indicate a carriage shift and carriage 2 will be shifted to the right until a finger of a storage gear 540 containing a value therein is brought into contact with bail 640 rocking said bail counterclockwise to terminate the shift. When bail 640 is allowed clockwise movement by a finger 543 when gear 541 is counted back to zero and when there is no value in the gears 540 of the higher orders, it will be apparent that bail 641 will also be allowed clockwise movement. Accordingly, when both bails 640 and 641 are moved clockwise the calculation is completed and the machine brought to rest.

Bail 641 which is pivotally mounted on shaft 642 has at its leftmost end a downwardly extending arm which has slot and pin connection with a lever 643 (Figs. 25 and 30). Lever 643 is pivotally mounted on digital actuator shaft 4, adjacent the inner face of the left hand side frame and is provided with a spring at its lower end which biases it in a counterclockwise direction. A link 644 is attached at its rearward end to lever 643 intermediate the fulcrum and the lower end of said lever. Link 644 extends forwardly and has slot and pin connection with a latch 645 pivotally mounted on shaft 646. Latch 645 is provided with an upstanding arm to the rear and integral therewith and a spring, attached to a pin in the forward end of link 644 and to said arm, normally biases latch 645 counterclockwise, to the limit defined by a slot in said latch. When there is a value set in any one of the storage gears 540, bail 641 will, therefore, be rocked counterclockwise by either bail 640 or one of the fingers 543. Accordingly lever 643 will be rocked clockwise (Figs. 25 and 30) thus moving link 644 toward the front of the machine. Latch 645 is therefore moved counterclockwise and a lug at the top thereof is brought to bear against the nose of an arm 647. Link 644 is afforded still further forward movement by the slot in latch 645 thereby tensioning the spring attached to the arm of said latch.

Arm 647 is fast upon shaft 591. Therefore when shaft 591 is rocked upon depression of multiplier key 588, arm 647 is accordingly rocked counterclockwise and the nose thereof is raised above the lug of latch 645. At the same time, another arm 648 pivotally mounted on shaft 591 adjacent arm 647 and having connection with bail 622 at its under side is rocked counterclockwise with said bail. Thus the nose of arm 648 is also moved above the lug on latch 645. Latch 645 is now moved counterclockwise by the spring attached to the arm thereof and the lug of said latch is moved beneath the noses of levers 647 and 648 (Fig. 30). From the foregoing, it will be seen that until all of the storage gears 540 are counted back to zero, bail 641 will be held in counterclockwise position.

Shaft 642 is provided with a crank 649 (Figs. 25, 29, 30 and 31) at the leftward end thereof and adjacent the inner face of the left hand side frame. Crank 649 has slot and pin connection with a lever 650 which is pivotally mounted on shaft 4 adjacent lever 643. A link 651 is connected at its rearward end to the lower arm of lever 650, and at its forward end to a crank 652 which is fast on shaft 646. At the point of connection with crank 652, link 651 also has slot and pin connection with the lower end of the depending arm of a lever 653. Lever 653 which is pivotally mounted on the left side frame, has a forwardly extending arm on which is pivoted at its lower end an upstanding latch 654. Latch 654 is provided with a shoulder which normally lies below the upper face of a lug 437' of lever 437 which is pivoted on the inner face of the left hand side frame. Latch 654 is biased in a clockwise direction by a suitable spring and is prevented from further clockwise movement beyond the position shown in Fig. 25 by a guide slot in bracket 655.

When a multiplier is set in storage gears 540 and a value is indicated in the units order gear, bail 640 and accordingly shaft 642 will be rocked counterclockwise. Thus lever 650 will be rocked clockwise (Fig. 31) moving link 651 toward the front of the machine. Crank 652 and shaft 646 will, therefore, be rocked counterclockwise and lever 653 clockwise. Latch 654 will be raised by lever 653 thereby bringing the shoulder of said latch above the lug 437' of lever 437. Fixed on shaft 646 upon the outside of the left hand side frame is the blocking member 656. When the machine is operated, as will be described later, the position of member 656 determines whether registration or carriage shift will be effected. Accordingly when shaft 646 is rocked counterclockwise (Fig. 31) member 656 will be rocked likewise and registration will be indicated. Conversely, if shaft 646 and member 656 are not rocked by bail 640, the position of the parts is as shown in Fig. 11 and a carriage shift is indicated. Furthermore, member 656 is biased in a clockwise direction (Fig. 31) by a spring 657, and thus through the connected parts serves to move bail 640 in a clockwise direction (Fig. 29) when storage gear 540 is counted to zero.

Arm 647 (Fig. 25) is provided with an extension and mounted on the extension is a pin which by engagement with the depending forked end of lever 437 normally holds said lever in its rearward position. Lever 437 is provided with a slot at its pivotal point and when arm 647 is rocked, as heretofore described, the pin of arm 647 will move said lever toward the front of the machine. Lug 437' is therefore moved beneath the shoulder of latch 654 as shown in Figs. 30 and 31. However, if latch 654 is in its lowered position, which will occur if the storage gear 540 of the units order stands at zero, said latch will be urged counterclockwise against the tension of its spring by lug 437'. As was previously set forth, if there is no value in the units order storage gear a carriage shift will be indicated and when a storage gear having a value therein is brought into position its associated finger will rock bail 640. It will therefore readily be seen that latch 654 will then be raised and its spring will move it clockwise to position its shoulder above the lug 437'.

Lever 437, as described in connection with the registering mechanism, has slot and pin connection with trigger 31 (Figs. 11 and 30) which normally holds pawl 25 out of engagement with shoulder 27 of rock arm 22. Trigger 31 is provided with a lever 31' which has a rearwardly extending arm provided with a nose normally in engagement between the teeth of an intermediate gear 545 located at the left of the machine, beyond the key columns but associated with the tens transfer mechanism. When lever 437 is in its normal rearward position, trigger 31 and lever 31' are coupled by slot connection with the pin mounted in the rear end of lever 437 (Fig. 24). Thus trigger 31 is adapted to be operated by gear 545 in the performance of division by the well-known overdraft method, wherein the extreme left hand intermediate gears are rotated only by a transitional tens transfer, as the dividend passes from positive to negative or from negative to positive registration. However, in the performance of multiplication, a tens transfer may move intermediate gear 545 which operates lever 31', and consequently it is necessary to disable lever 31' during the program of multiplication. Accordingly when lever 437 is moved toward the front of the machine, the pin in the rear thereof is moved forward in the slots of trigger 31 and lever 31' to the position of the parts shown in Fig. 11. The slot in lever 31' is enlarged downwardly at its forward end and therefore when lever 31' is operated it will be ineffective to contact the pin of lever 437 and thereby raise trigger 31 from engagement with pawl 25.

As was described in connection with the registration and carriage shift mechanisms, when clutch lever 111 (Fig. 11) is moved clockwise plus registration normally will be effected and when moved counterclockwise minus registration will be effected. However, when shaft 365 is rocked counterclockwise, the drive to the actuators will be disconnected and the drive will be connected to the carriage shift devices; and if then clutch lever 111 is moved to its plus position a right carriage shift will be effected and if moved to its minus position a left carriage shift will be effected. Consequently, control of clutch lever 111 and shaft 365 will control the registration and carriage shift in the program of multiplication. In view of the foregoing, a pair of slides 658 and 659 (Figs. 33, 34 and 35) are adapted to move clutch lever 111 either to its plus or minus position respectively. The general configuration of the slides is most clearly seen in the exploded perspective (Fig. 34). From an inspection of Fig. 33, it will be seen that slide 659 is mounted to the rear and adjacent slide 658. The forward portions of the slides are in slidable contact and slide 659 is bent inwardly and extends toward the rear of the machine in spaced relationship to slide 658. The slides are provided with suitable slots at their forward ends, whereby they are mounted for longitudinal movement on shaft 646 which extends outwardly from the left hand side frame, and toward their rear the slides are further provided with similar slots through which extends a stub shaft 660 mounted on the side frame. At their rear, the slides 658 and 659 are provided with substantially square openings, and pin 489 mounted on clutch lever 111 extends outwardly through said openings. It will be noted that when the parts are in their normal positions (Fig. 24) pin 489 is centrally located between the front and rear edges which define the openings and that the distance is sufficient to allow operation of clutch lever 111 without interference from the slides 658 and 659.

From the foregoing, it will be seen that if slide 658 is moved toward the rear of the machine, an edge of the opening in said slide will contact pin 489 and thus move clutch lever 111 clockwise to its plus position. Also, if slide 659 is moved toward the front of the machine, said slide will in like manner operate to move clutch lever 111 counterclockwise to its minus position. Accordingly provision is made for the control and operation of slides 658 and 659 as follows:

Slide 658 is provided at its forward end, and to the right of the slot therein, with a forwardly extending lug 658'. Slide 659 is provided with a similar lug 659' adjacent its forward end but to the left of the slot therein. From an inspection of Fig. 33, it will be seen that lug 659' extends outwardly below slide 658 and that the lugs are spaced equi-distantly on either side of shaft 646.

A control plate 661 (Figs. 16, 24 and 35) is pivotally mounted on shaft 646. Plate 661 is positioned between the lugs 658' and 659' and is provided with right and left wings. The right wing of plate 661 is adapted for blocking engagement with lug 658' and the left wing for engagement with lug 659'. However, when the parts are in their normal position lugs 658' and 659' are a slight distance to either side of plate 661 thus allowing said plate to be rocked in either direction (Figs. 24 and 35).

Pivotally mounted at its lower end on shaft 646 and to the rear of slide 659 is the lower link 662 of a toggle including an upper link 663 (Figs. 16, 24 and 35). The upper end of toggle link 663 is pivoted to the forward end of an arm of a lever 664 which is fulcrumed on a stud extending outwardly from the side frame. Lever 664 is biased in a clockwise direction by a spring 665. However, when toggle 662—663 is in set position, as shown in Fig. 24, lever 664 is thereby held in counterclockwise position against the tension of spring 665.

The rearwardly extending arm of lever 664 is provided with a depending link 666 to which is attached at its lower end links 667 and 668. Link 667 extends forwardly and has pivotal connection with slide 658 and link 668 extends rearwardly and has pivotal connection with slide 659. Thus it will be seen that when lever 664 is rocked clockwise link 666 will be raised. Accordingly, link 667 will move slide 658 toward the rear of the machine and link 668 will move slide 659 toward the front of the machine. However, as either the right or left wing of control plate 661 will be in blocking position with either lug 658' or 659' respectively, movement is accorded only one of the slides 658 or 659.

From the foregoing, it will be seen that when toggle 662—663 is broken, lever 664 will be rocked clockwise by spring 665 thus raising link 666. If control plate 661 is in counterclockwise position (Figs. 16, 24 and 35) the left wing thereof will be in blocking position with lug 659' thus preventing slide 659 from being moved toward the front of the machine. However, the right wing of the control plate 661 will be raised above lug 658' thus allowing slide 658 to be moved toward the rear of the machine and into contact with pin 489 of clutch lever 111 to move said lever into its plus position. Conversely, if control plate 661 is in clockwise position, the right wing thereof will be in blocking position with lug 658' and the left wing thereof will be raised above lug 659' thus allowing slide 659 to be moved toward the front of the machine and move the clutch lever to its minus position. The plus or minus registrations in a program of multiplication to be described will therefore be effected upon breaking of toggle 662—663.

As has been hereintofore described, if shaft 365 (Fig. 11) is rocked counterclockwise when clutch lever 111 is moved to active position, a carriage shift is initiated. Accordingly, when a carriage shift is indicated in a program of multiplication, provision is made for rocking of shaft 365 upon breaking of toggle 662—663 as follows:

The rearward end of an arm 669 (Figs. 16, 17, 24, 35 and 11) is pivotally mounted on the forward end of the arm of lever 664 at a common point of attachment with toggle link 663. Arm 669 extends downwardly and is slidably supported by a pin 670 extending outwardly from the side frame and passing through a slot in the forward end of said arm. A lever 671 is fulcrumed on arm 669 intermediate its connection to lever 664 and the slot in the end thereof. The upper end of lever 671 is pivotally attached to a squared stud 671' which extends a short distance inwardly therefrom and is mounted on the forward end of a link 672. Link 672, as best seen in Fig. 11, extends toward the rear of the machine and is pivotally mounted on an arm of a crank lever 673. Lever 673 is fulcrumed on shaft 350 and has a rearwardly extending arm which underlies a shoulder of crank arm 383 which is fixed on shaft 365. Link 672 is biased toward the rear of the machine by a spring 674, thus normally holding crank lever 673 in counterclockwise position. It will be apparent however, that if the upper end of lever 671 is moved toward the front of the machine, link 672 will likewise be moved, thus rocking crank lever 673 clockwise and thereby rocking crank arm 383 and shaft 365 in a counterclockwise direction.

Lever 671 extends downwardly (Figs. 11 and 17) and terminates in a toe extending to the right thereof and adapted for contact with blocking member 656. It will be recalled that the position of blocking member 656 will be determined by the position of bail 640 (Fig. 29). Accordingly, if there is a value in the associated storage gear 540, finger 543 will rock bail 640 counterclockwise (Fig. 29) and blocking member 656 through the connected parts will be rocked counterclockwise (Fig. 31), clockwise (Fig. 17), against the tension of spring 657. In this position, the extension of member 656 adapted for blocking engagement with the toe of lever 671 is moved above said toe. Therefore when toggle 662—663 is broken to engage clutch lever 111, arm 669 will be moved forwardly as lever 664 is allowed clockwise movement. The pivotal point of lever 671 on arm 669 will likewise be moved forwardly (Figs. 16 and 17) but as the toe of said lever 671 is free to move beneath the extension of blocking member 656 (Fig. 17) said lever will be moved counterclockwise about its pivotal connection at its upper end on the stud 671' at the end of link 672. Accordingly, link 672 will not be moved from its rearward position and engagement of clutch lever 111 will result in registration.

When the blocking member 656 is in the counterclockwise position (Fig. 11), at which time the storage wheel 540 associated with bail 640 will stand at zero, the extension of said blocking member will be in the path of movement of the toe of lever 671. Therefore, when toggle 662—663 is broken, the lower end of lever 671 will be blocked from movement and as the fulcrum of said lever on arm 669 is moved forwardly, the upper end of said lever 671 will likewise be moved. Accordingly, link 672 will be moved toward the front of the machine, against the tension of its spring 674, and crank lever 673, crank arm 383 and shaft 365 will be rocked, thereby initiating a carriage shift as clutch lever 111 is moved to active position.

A plate 675 (Figs. 16, 24, 35 and 11) is pivotally mounted at its upper end on a shaft 676 extending outwardly from the framing of the machine. Plate 675 is provided with a depending arm which is adapted for engagement by an arm 677 fast on shaft 591 which extends outwardly beyond the left hand side frame. Plate 675 is further provided with a rearward extension comprising an inwardly turned portion which constitutes a shelf which normally blocks a latch lever 678 from counterclockwise movement (Fig. 24). Latch lever 678 is biased in counterclockwise direction by a suitable spring attached to a lug thereof and to plate 675. The rearward and latching end of latch lever 678 is normally positioned above and out of engagement with stud 671' of lever 671. However, when a carriage shift is initiated latch 678 by contact with shaft 671' (Fig. 11) serves to hold link 672 in its forward position and to terminate the shift by release thereof. The forward end of latch lever 678 is provided with pin and slot connection with the upper end of a link 679. Link 679 extends downwardly and is attached to blocking member 656 (Fig. 11) which when rocked clockwise will likewise rock latch lever 678 clockwise by means of said link. When blocking member 656 is rocked to its counterclockwise position (Fig. 11) latch lever 678 will be also allowed counterclockwise movement until blocked from further movement by the shelf of plate 675. Furthermore, if plate 675 is also rocked to its counterclockwise position, as will be described, said latch lever 678 will be allowed further movement by its slot connection with link 679 and will thus be brought into engagement with stud 671'.

A hook member 680 (Figs. 16, 24 and 35) is pivotally mounted on plate 675 below its pivot on shaft 676, and a spring attached at the pivotal point of said hook to plate 675 biases said hook and plate as a unit in a clockwise direction. Hook 680 extends upwardly and the effective end thereof is normally positioned above and is adapted for contact with an arm 663' integral with and extending upwardly to the right of toggle link 663. Accordingly counterclockwise movement of plate 675 will bring hook 680 into contact with arm 663' and break toggle 662—663. Hook 680 is provided with an arm 680' positioned between pin 670 and a pin 681 mounted at the end of a rightward extension of toggle link 662, and pins 670 and 681 are adapted for contact with arm 680' as will be described.

A link 682 is mounted at its forward end by pin 681 on the extension of toggle link 662. Link 682 extends toward the rear of the machine and has slot and pin connection with a crank 683 (Fig. 24) which is fixed on the outwardly extending end of shaft 379 of the carriage shift worm. Link 682 is provided with a depending tooth 682′ intermediate its ends and said tooth is adapted to be contacted by a pin 684 mounted on rock arm 22′. Rock arm 22′ is fixed on shaft 636 and is spaced outwardly from rock arm 22, and the two arms are connected at their upper ends by a shaft extending therebetween, whereby said arms are adapted to be rocked in unison by link 21 attached at its rear to crank 20.

A trip arm 685 (Figs. 16, 24 and 35) is pivotally mounted at its rear on the upper end of arm 24 and extends forwardly with its free end normally resting upon the shelf of plate 675. Trip arm 685 is provided with a shoulder adjacent its free end and said shoulder is adapted for contact with the arm 663′ of toggle link 663. However, the shoulder of trip arm 685 is normally held raised above and to the rear of arm 663′ by the shelf of plate 675. Arm 685 is biased downwardly by a suitable spring and thus when plate 675 is rocked counterclockwise the shoulder of said arm is brought into position for engagement with arm 663′ (Fig. 35).

Bail 622 extends to the left of the machine and under the left hand side frame to its pivotal mounting at the end of leftwardly extending shaft 591 where said bail is provided with a rearwardly extending arm 689. Arm 689 underlies a pin 661′ on the right wing of control plate 661 and upon clockwise movement as viewed in Fig. 35 is adapted to engage said pin and thus move said control plate in a counterclockwise direction.

Blocking member 656 is provided with a downwardly extending arm provided with a pin 656′ extending outwardly therefrom. Pin 656′ is adapted for blocking engagement with either side of a recessed edge of control plate 661, and a spring 690 attached to said pin and plate biases said plate in a clockwise direction, as seen in Fig. 35. Thus it will be seen that when there is a value in the units order storage gear 540, blocking member 656 will be rocked clockwise and likewise plate 661 will be rocked clockwise by spring 690 to its minus control position. However, as control plate 661 must be in plus position to control plus registration and right carriage shift, depression of multiplier key 588 and consequent rocking of bail 622 will bring arm 689 into contact with pin 661′ thereby rocking plate 661 counterclockwise to its plus position.

When shaft 591 is rocked upon depression of multiplier key 588, arm 677 by contact with the depending arm of plate 675 rocks said plate in a counterclockwise direction thus moving hook 680 downwardly and to the right to engage arm 663′ of link 663; thereby moving said link clockwise to break toggle 662—663 (Figs. 16 and 17). As toggle 662—663 is broken, slide 658 is moved toward the rear, to contact pin 489 of clutch lever 111. Hook 680 is frictionally restrained at its pivotal point on plate 675 so that it will remain in adjusted position, and after said hook has broken toggle 662—663 provision is made to move said hook out of the path of movement of toggle arm 663′ so that the toggle may be reset without interference from said hook. Accordingly, when toggle link 662 is moved counterclockwise upon breaking of toggle 662—663, pin 681 thereon will contact arm 680′ thus moving hook 680 clockwise out of the path of arm 663′ and said arm 680′ into contact with fixed pin 670 which acts as a stop therefor (Fig. 16).

During the first half of the initial cycle of registration, rock arm 22′ is rocked clockwise by link 21 (Fig. 35), and since tooth 682′ of link 682 is in the path of movement of pin 684 of said rock arm, link 682 will be moved toward the front of the machine and will rock toggle link 662 in a clockwise direction and thereby reset toggle 662—663.

During each cycle of registration counting finger 626 (Fig. 3) will be operated to move the units order storage gear 540 clockwise one step of movement toward its zero position and said movement will be effected during the first half of the registering cycle. Consequently, when storage gear 540 is moved to its zero position, finger 543 (Fig. 29) will be moved counterclockwise to enter recess 542 on the hub 541 of said storage gear. Therefore, bail 640 will be moved in a clockwise direction and bail 641 will remain held in counterclockwise position by counting fingers 543 if there is a value in any of the higher order storage gears 540. When bail 640 is allowed clockwise movement, spring 657 (Fig. 31) will move blocking member 656 and crank 652 clockwise and lever 653 counterclockwise, to the position shown in Fig. 32. Thus trip arm 654 is moved downwardly and by contact with lug 437′ will rock lever 437 counterclockwise and thereby lift trigger 31 to release pawl 25. Pawl 25 is now in the path of movement of shoulder 27 of rock arm 22 and as arm 24 is carried to the fixed stop 29, the extension 144 of arm 24 contacts pin 145 thus moving clutch lever 111 to its central position and thereby disconnecting the drive to the actuators (Fig. 11).

As arm 24 is carried to the fixed stop 29, trip arm 685 (Fig. 35) attached thereto is moved toward the front of the machine, and as arm 663′ of toggle link 663 is in the path of movement of the shoulder of said trip arm 685, toggle link 663 will be moved clockwise, thereby breaking toggle 662—663. Arm 22 coupled with arm 24 by pawl 25 will be allowed only limited clockwise movement as arm 24 is carried to stop 29. Therefore, tooth 682′ of link 682 which is moved to the rear when toggle 662—663 is broken (see Fig. 16), will not be engaged by pin 684 on arm 22′ to reset the toggle. Upon breaking of the toggle, slide 658, as heretofore described, will be moved toward the rear of the machine to contact pin 489 of clutch lever 111. However, as clutch lever 111, is held in its neutral position by extension 144 of arm 24, slide 658 will be ineffective at this time to move said clutch lever to its plus position. Furthermore, as toggle 662—663 is broken, the lower end of lever 671, as shown in Fig. 11 will be blocked from forward movement by blocking member 656. Therefore, the upper end of lever 671 will be moved forwardly and consequently link 672 will be moved toward the front of the machine. Link 672 will therefore rock crank lever 673 clockwise and crank arm 383 and shaft 365 counterclockwise to initiate a carriage shift when clutch lever 111 is moved to active position.

When blocking member 656 is rocked to the position shown in Fig. 11, link 679 is moved upwardly and thus allows latch 678 to be moved counterclockwise by its spring, with the rear end thereof resting on square stud 671′. Thus when the upper end of lever 671 is moved to the right, square stud 671′ is moved to the front of the shoulder of latch 678. Latch 678 is therefore allowed further counterclockwise movement to latch link 672 in its forward position as shown in Fig. 11. Also it will be apparent that when toggle 662—663 is broken link 682 will again be moved toward the rear of the machine.

When arm 24 returns from the fixed stop 29, thus releasing clutch lever 111, slide 658 (Fig. 35) will be urged further toward the rear of the machine and thus move clutch lever 111 to its plus position and a carriage shift to the right will be initiated. During the first half of the initiated shift cycle, the pin on crank 683 (Fig. 16) which is fast on the shift worm shaft 379, will operate to move link 682 toward the front of the machine, thus resetting toggle 662—663. The rearward movement of link 682 when toggle 662—663 is broken is allowed by the pin and slot connection to crank 683, thereby bringing the forward end of said slot toward the rear and adjacent the pin on crank 683. Therefore when crank 683 is rotated, the pin thereon will move link 682 forward, thus resetting toggle 662—663.

As has been described in connection with the carriage shift devices, as long as shaft 365 is held in counterclockwise position, the carriage shift will be continuous through the successive orders. Therefore, the carriage shift will not be terminated until latch 678 is moved to release link 672 and thereby allow shaft 365 to be restored. Accordingly, if there is a value in the next higher order multiplier gear 540, the associated finger 543 will be moved into contact with bail 640 as carriage 2 is shifted toward the right when said bail will be rocked counterclockwise (Fig. 29) thereby, thus terminating the shift in that order. However, if the next higher order or successive orders of storage gears stand at zero and there is a value in a higher order storage gear, carriage 2 will be shifted without interruption until the associated finger 543 of the next order gear containing a value is moved into position to rock bail 640 and thus terminate the shift as follows:

When bail 640 is rocked counterclockwise by finger 543, link 651 will restore the parts to the position shown in Fig. 31. Trip arm 654 will therefore be raised from contact with lug 437' thus allowing lever 437 to be rocked clockwise and trigger 31 lowered to its normal position. Furthermore, blocking member 656 will be rocked clockwise from the position shown in Fig. 11, whereby said member will be out of blocking position with lever 671. Link 679 attached to blocking member 656 will therefore be lowered and latch lever 678 rocked clockwise from engagement with square stud 671'. Link 672 will thus be released and spring 674 will move it toward the rear of the machine, rocking crank 673 counterclockwise (Fig. 7). Therefore crank arm 383 and shaft 365 will be allowed clockwise movement to terminate the carriage shift.

As described in connection with the carriage shift devices, clutch 371 (Fig. 16) is operated at the termination of a carriage shift and arm 24 is moved thereby to the fixed stop 29. Therefore extension 144 will be raised to move clutch lever 111 to its neutral position. Furthermore, trip arm 685 will be moved toward the front of the machine and will contact arm 663' of toggle link 663, thereby breaking toggle 662—663. It will therefore be seen that as blocking member 656 is out of position to block the lower end of lever 671 and move link 672, clutch lever 111 will be moved to effect plus registration when released as arm 24 returns from fixed stop 29. The machine will thus effect alternate registration and carriage shift until the highest order multiplier storage gear in which a value is set is counted back to zero to complete the calculation.

Both bails 640 and 641 being unrestrained by fingers 543 are simultaneously rocked clockwise to normal when all of multiplier storage gears 540 have been counted back to zero. Therefore both links 644 and 651 are moved toward the rear of the machine to their normal position shown in Fig. 25. Trip arm 654 is moved downwardly, as heretofore described, to rock lever 437, and raise trigger 31 to release pawl 25 for engagement with arm 24. At the same time, latch 645 is rocked clockwise whereby it is removed from restraining engagement with arms 647 and 648. Accordingly shaft 591 and arm 647, fast thereon, are rocked clockwise to normal by the spring attached to crank 589' (Fig. 28) fast on said shaft. Arm 677 fast on shaft 591 is therefore rocked counterclockwise to the position shown in Fig. 24 and is thus removed from restraining engagement with the depending arm of plate 675. Plate 675 is therefore moved clockwise to normal by the spring attached thereto and latch 678 is thereby also rocked clockwise to its ineffective position. Hook 680 mounted on plate 675 is moved counterclockwise to its position above toggle arm 663' by contact of its arm 680' with fixed pin 670. Furthermore as plate 675 is restored clockwise to normal, the forward end of trip arm 685 is raised above arm 663' of toggle link 663. Crank 592 (Fig. 28) also will return slide 593 toward the front of the machine and thereby render counting finger 626 ineffective. As arm 647 (Fig. 25) is rocked clockwise to normal, the pin on the extension thereof moves lever 437 to the rear of the machine, thus restoring the coupling between trigger 31 and lever 31' and also moving lug 437' from beneath the shoulder of trip arm 654. Bail 622 and connected arm 648 which is released by latch 645 are rocked clockwise to normal (Figs. 25 and 28) by the spring attached to pin 622' and arm 689 will be moved counterclockwise (Fig. 24) from restraining engagement with pin 661' of control plate 661. Therefore, from the foregoing it will be seen that when arm 24 is moved to fixed stop 29, trip arm 685 will be moved ineffectively above arm 663' of toggle link 663. Thus toggle 662—663 will remain unbroken and upon return of arm 24, the machine will be stopped in full cycle position.

*Minus multiplication*

In minus multiplication, subtractive registration is effected in the product-dividend register and the carriage 2 is shifted toward the right. Accordingly provision is made for moving clutch 111 to its minus position to effect the registering operation and to its plus position to effect carriage shift to the right. Therefore when toggle 662—663 is broken to initiate a registering operation, control plate 661 (Figs. 16, 24 and 35) is in clockwise position. When in clockwise position, the right wing of control plate 661 will be in the path of movement of lug 658' of slide 658 and the left wing thereof will be raised above lug 659' of slide 659. Therefore, when toggle 662—663 is broken slide 658 will be blocked from movement and slide 659 will be moved toward the front of the machine, thus moving clutch lever 111 to its minus position. Conversely, when a carriage shift is indicated, control plate 661 will be in counterclockwise position and when toggle 662—663 is broken clutch lever 111 will be moved to plus position.

Accordingly when minus multiplier key 589

(Fig. 28) is depressed, crank 589′ fast on shaft 591 and having slot and pin connection with the stem of said key will rock said shaft in counterclockwise direction. However, shaft 591 will be rocked independently of bail 622, said bail being held in normal position by its spring. With reference to Fig. 32, it will be seen that when the nose of lever 647 fast on shaft 591 is raised above latch 645, said latch will be moved counterclockwise above the nose of lever 648 and beneath that of lever 647, thus holding said lever 647 in adjusted position. Therefore, latch 645 will be operated the same as described in connection with multiplier key 588 and will be removed from restraining engagement with lever 647 when all of storage gears 540 have been counted back to zero.

As bail 622 remains in the normal position shown in Fig. 24, arm 689 thereof will be out of engagement with pin 661′ on control plate 661. Therefore control plate 661 is allowed clockwise movement to its minus position. Thus when bail 640 (Fig. 29) is rocked by finger 543, indicating a value in the associated storage gear 540, and blocking member 656 is accordingly rocked clockwise (Figs. 16 and 17), control plate 661 is also rocked clockwise to its minus position by spring 690 attached to said plate and to pin 656′ on said blocking member. Therefore upon depression of minus multiplier key 589 and the consequent rocking of shaft 591 and arm 677 fast thereon, plate 675 and hook 680 will be rocked thereby breaking toggle 662—663 and thus initiating minus registration. When blocking member 656 is moved back to counterclockwise position to indicate a carriage shift, pin 656′ thereon will likewise move control plate 661 to the plus position shown in Fig. 24 and therefore when toggle 662—663 is broken a right carriage shift will be initiated. Thus it will be seen, that except for the provision for minus setting of control plate 661, a program of minus multiplication includes the same sequence of operations as effected in a program of plus multiplication initiated by key 588.

*Ancillary operations*

Figure 20:
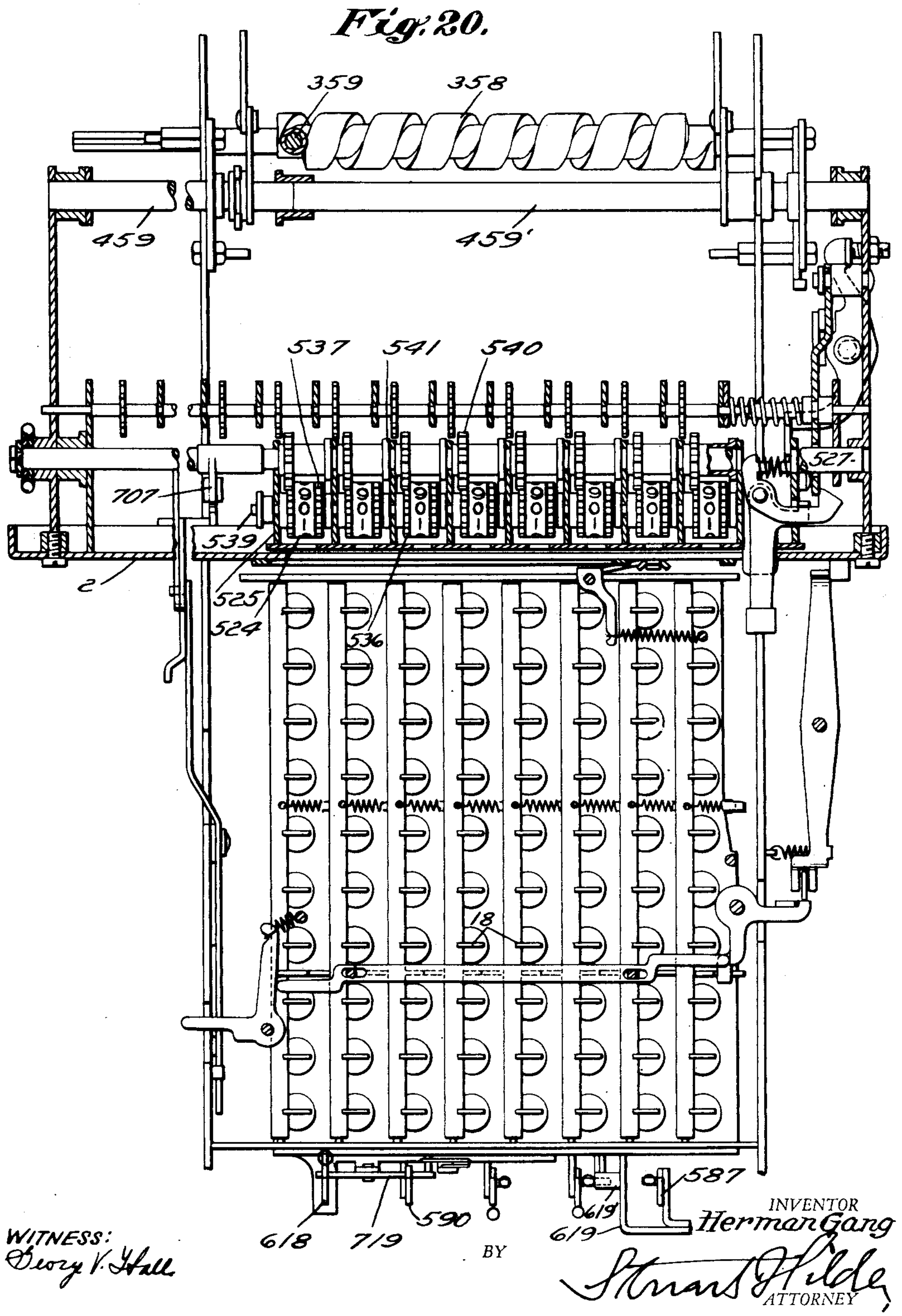
Fig. 20 is a partial section taken substantially on the line 20—20 of Fig. 8 showing the subcarriage in normal position in the main carriage and the keyboard with the cover plate and key buttons removed.
Figures 21, 22, 23:
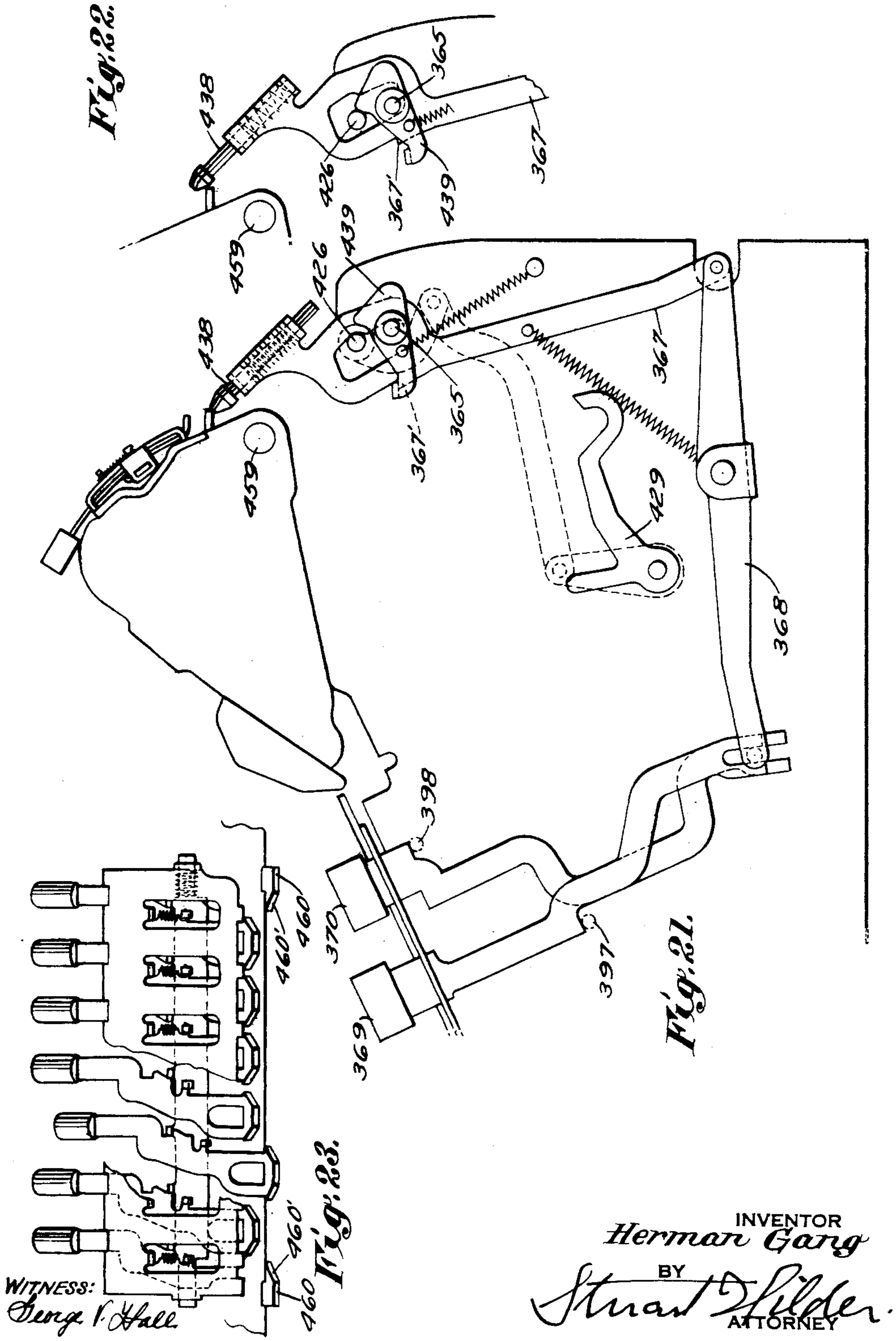
Fig. 21 is a right side elevation of the carriage shift keys and certain mechanisms associated therewith.
Fig. 22 is a fragmentary view showing certain parts illustrated in Fig. 21 in another position.
Fig. 23 is a rear elevation of parts shown in Fig. 21.
Figure 28:
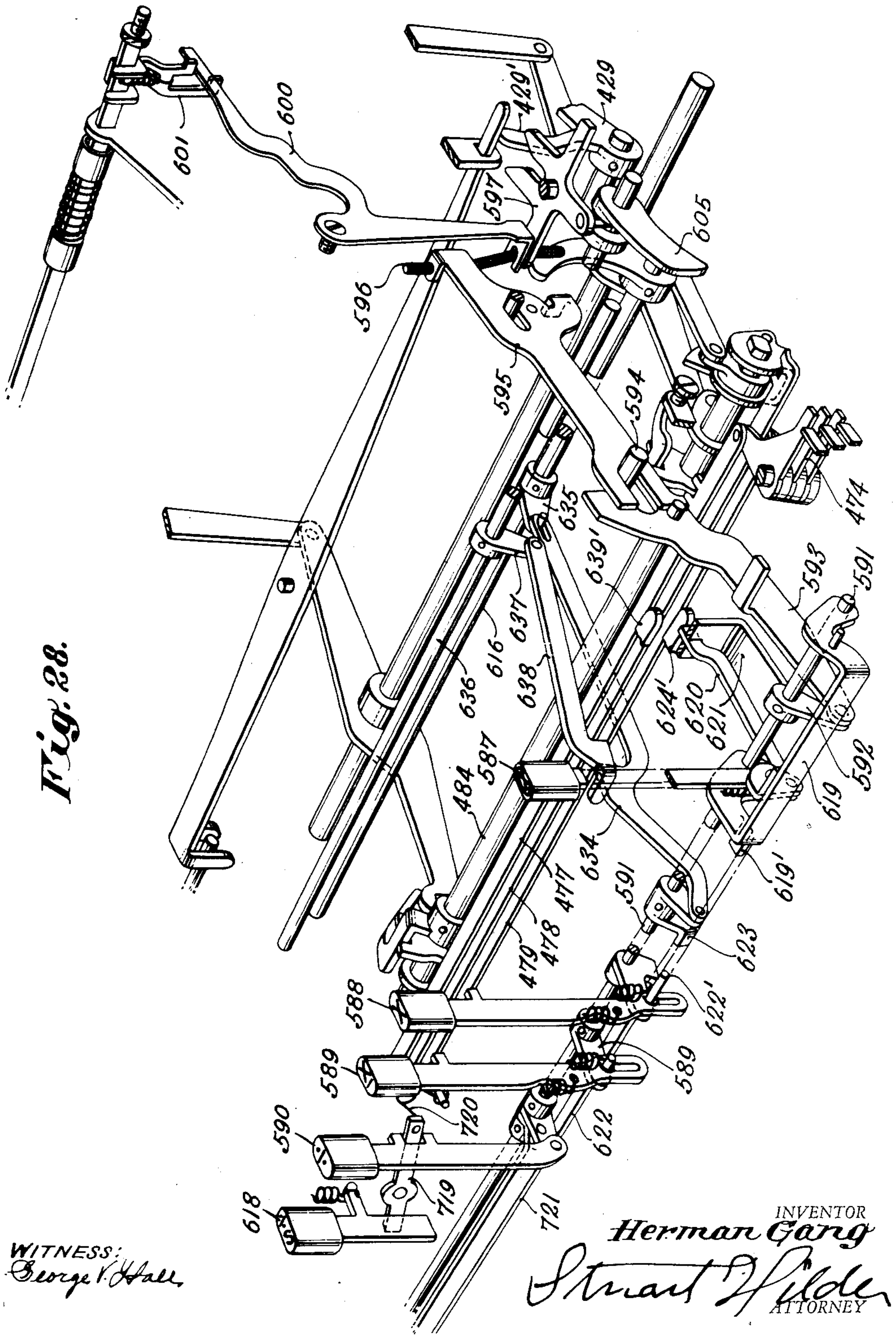
Fig. 28 is a perspective view of portions of the setting and control mechanisms with several of the parts in exploded relationship.

A program of multiplication initiated by key 587 (Figs. 1 and 28) includes a clearout cycle prior to the calculation, which clears the product-dividend register 13 and the multiplier-quotient register 85; and after the calculation a keyboard clearout cycle which is followed by a carriage return to the left. Furthermore, the program initiated by multiplier keys 588 and 589 is the same as that initiated by key 587 with the omission of the clearout cycle preceding the calculation and the carriage return operation and the provision for subtractive registration when the program is initiated by key 589. Therefore, it will be readily understood that the following description of a program of multiplication taken in connection with key 587 includes the operations in connection with keys 588 and 589, with the exceptions outlined in the foregoing. Accordingly, with carriage 2 in the extreme left hand position, a multiplier set in the multiplier storage devices, and a multiplicand set on keys 18 of the keyboard, an operation is effected as follows upon depression of multiplier key 587:

The lower end of the stem of key 587 is attached by a suitable lug to a bail 619 (Figs. 20 and 28). Bail 619 is provided with rearwardly extending arms whereby said bail is pivotally mounted on shaft 591 which is located at the lower front of the machine. Shaft 591 is also pivotally mounted and extends between and a distance beyond the side frames of the machines at either end. The arm at the right hand end of bail 619 extends to the rear to its mounting on the outwardly extending end of shaft 591 at the outside of the right hand side frame, and is provided with a pin which overlies the forward end of lever 598 (Fig. 7). Bail 619 extends inwardly at the front of the side frame and the arm at the left hand end thereof is provided with a depending portion on which the forward end of a push arm 620 is pivotally mounted. Arm 620 extends toward the rear and the free end thereof is supported and guided by a slot in bracket 621 which is mounted on the base plate of the machine (Figs. 2 and 28). A lug 619′ extending from the left of bail 619 overlies a pin 622′ in a forwardly extending arm of a bail 622, as indicated by the dot-dash lines in the partially exploded perspective Fig. 28 and more clearly seen in Fig. 20. A suitable spring attached at the bottom of the stem of key 587 normally holds said key and accordingly bail 619 in raised position.

From the foregoing it will be seen that depression of multiplier key 587 will rock bail 619 counterclockwise, to the position shown in Fig. 18, and that the lug 619′ by engagement with pin 622′ will accordingly rock bail 622 counterclockwise (Fig. 28), to the position shown in Fig. 11. Furthermore, the forwardly extending arm of bail 622, by engagement with the lug of crank 623 fixed on shaft 591, will rock said shaft counterclockwise (Fig. 28, clockwise, Fig. 11). Accordingly bail 622 and shaft 591 are rocked independently of keys 588 and 589, said keys being held in raised position by suitable springs as shown in Fig. 28.

Figure 26:
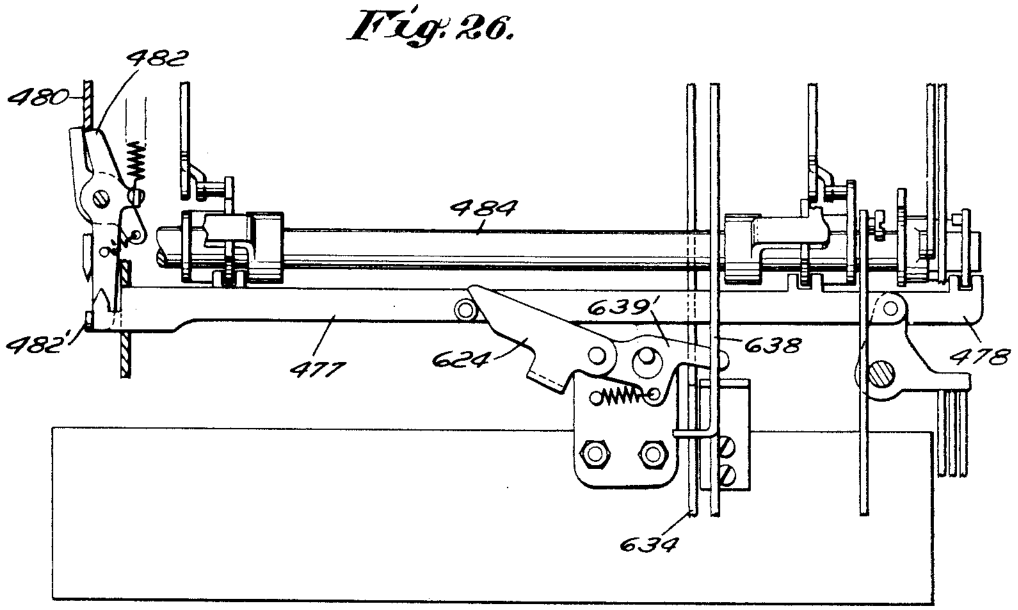
Fig. 26 is a fragmentary plan view of certain portions of the clearout mechanism.
Figure 27:
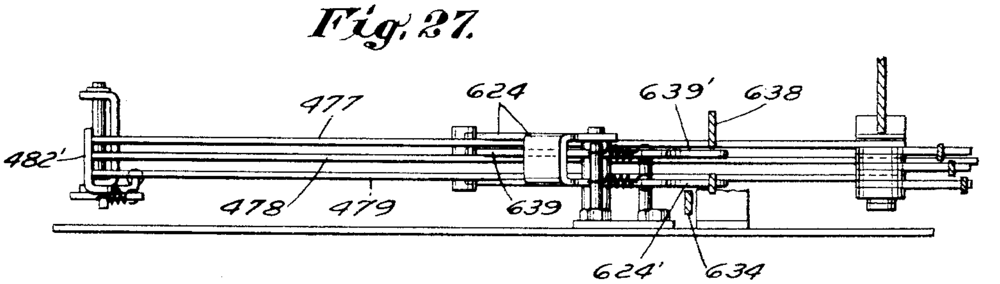
Fig. 27 is a front elevation of the parts shown in Fig. 26.

When bail 619 is rocked counterclockwise (Figs. 2 and 28), trip arm 620 which is mounted at its forward end on the depending extension of the left arm of said bail is moved toward the rear of the machine. The rear and free end of arm 620, which is supported in and guided by a slot in bracket 621, is thus brought into contact with an arm 624′ integral with and extending to the right of a two bladed cam lever 624 (Figs. 2, 26, 27 and 28). Cam lever 624 is thus rocked counterclockwise against the tension of a suitable spring (Fig. 26). The effective edge of the upper blade of cam lever 624 is in contact with a roller on slide 477 and the effective edge of the lower blade of said cam lever is in contact with a roller on slide 479. Therefore, when cam lever 624 is rocked, slides 477 and 479 are moved to the left (Figs. 26 and 27).

As described in detail in my co-pending application Serial No. 8,547, filed of even date herewith, slides 477 and 479, together with keyboard clear slide 478, may be operated collectively or individually to engage a clearout clutch 464 (Fig. 16) through release of a latch 482, normally holding a spring operated clutch engaging slide 480 in restrained position. Slides 477 and 479 also, upon movement to the left, effect coupling of a product-dividend register clearout train and a multiplier-quotient register clearout train, respectively, to the general clearout means, mounted on shaft 484. Slide 478 effects a similar coupling of a keyboard clearout train. Thus, upon depression of key 587, a cycle of clutch 464 is initiated, which will effect clearing of the product-dividend and the multiplier-quotient registers. As the clearout cycle may be completed before the operator has released key 587, provision is made for the restoration of slides 477, 479 and cam lever 624 without interference of trip arm 620. Accordingly when the trip arm reaches the end of its rearward travel, its free end is lifted by the slot in bracket 621 above arm 624′ of cam lever 624 (Figs. 2 and 28). It may be well to note at this point that although bail 619 is restored upon release of key 587, shaft 591 and bail 622 will remain rocked until the end of the calculation.

The devices which provide for the return carriage shift are set as both bail 619 and shaft 591 are rocked. As heretofore described, the right hand arm of bail 619 (Fig. 18) is provided with a pin overlying the forward end of lever 598. As set forth in my co-pending application Serial No. 8,547, filed of even date herewith, a recess 598′ at the rear of said lever normally is in engagement with an outwardly extending arm of a rocker 597, thus holding said rocker in its central position. Accordingly when bail 619 is rocked the pin overlying the end of lever 598 will rock said lever counterclockwise thus raising its rearward end and releasing rocker 597 from restraining engagement with recess 598′. A latch 609 (Fig. 18) will now be moved counterclockwise by spring 599 to a position underlying lug 610 and thus holding lever 598 in rocked position until the return carriage shift is initiated. Latch 611, the operation of which is described in the aforenamed application Serial No. 8,547, is also moved beneath lug 610 upon initiation of the clearout cycle for wheels 13 and 85. However, as said latch will be restored upon completion of the clearout cycle, it will be ineffective to hold lever 598 in rocked position. Thus, the operation of latch 611 is incidental to the present disclosure. As shaft 591 is rocked, crank 592 fixed thereon will move slide 593 toward the rear of the machine and if slide 595 (Fig. 28) is in its forward position, it will also be moved toward the rear. As described in the above noted co-pending application Serial No. 8,547, the machine is accordingly set for left carriage return shift, rocker 597 being urged in a clockwise direction by spring 596 so that arm 605, which is rocked during the clearout cycle, will normally be effective to depress the left shift key. However, as was also described in said co-pending application, lever 600 will be blocked from counterclockwise movement by stop 601 when carriage 2 is in the extreme left hand position, and rocker 597 will remain centralized during the clearout cycle for wheels 13 and 85. Accordingly, when arm 605 is rocked during the clearout cycle, said arm will move idly between the pins 369′ and 370′ of the carriage shift keys 369 and 370 (Fig. 13). However, when the keyboard clearout cycle is effected at the end of the calculation, arm 605 will operate to depress left shift key 370.

When shaft 591 is rocked, the setting which provides for the keyboard clearout cycle following the calculation is effected by crank 623 which is fixed on said shaft. Crank 623 is provided with an arm integral therewith, and connected to the arm at its forward end is a link 634 (Figs. 2, 26, 27 and 28). Link 634 extends toward the rear of the machine and has slot and pin connection with a crank 635 fast on shaft 616. Arm 22 (Fig. 11) is fast on shaft 636 which extends between the side frames of the machine and fixed thereon is a depending crank 637 (Figs. 2 and 28) to which is pivoted the rearward end of a trip arm 638. Trip arm 638 extends forwardly and is provided with a shoulder and a lug extending to the left (Fig. 28) at the free end thereof. The lug of trip arm 638 rests upon link 634 and the shoulder of said trip arm normally is positioned just above the rightwardly extending arm 639′ of cam lever 639 (Figs. 2 and 27). Trip arm 638 is guided by the slot in bracket 621 as shown in Fig. 2. In the exploded perspective (Fig. 28), however, the pawl is shown displaced from bracket 621 and arm 639′. Cam lever 639 which has common pivotal mounting with cam lever 624 is adapted for contact with a roller on keyboard clearout slide 478. Accordingly when shaft 591 is rocked counterclockwise, the arm of crank 623 will lower the forward end of link 634, and thus lower the forward end of trip arm 638 to bring the shoulder of said trip arm in front of arm 639′ of cam lever 639. Upon the first registering cycle of the machine, shaft 636 will be rocked counterclockwise (Figs. 2 and 28) by arm 22 (Fig. 11) and thus move trip arm 638 toward the rear of the machine. The shoulder of trip arm 638 will therefore contact arm 639′ and rock cam lever 639 counterclockwise (Fig. 26). Cam lever 639 by contact with the roller on slide 478 will move said slide to the left. This action would normally initiate a keyboard clearout cycle. However, as will be later described, detent 487 (Fig. 24) of clearout clutch 484 is at this time restrained from disengagement and the clearout cycle is delayed until the completion of the calculation.

A blocking lever 686 fulcrumed on a stud in the left hand side frame (Figs. 16, 17, 24 and 35) is provided with a nose at its rearward end which is adapted to be moved into the path of movement of a square stud 491 mounted on slide 480. Blocking lever 686 is biased in a clockwise direction by a spring attached to lever 493, but is normally held in its counterclockwise position (Fig. 24) by an arm 687 which is fixed on shaft 591 and has an inwardly turned end which underlies an extension at the forward end of lever 686. A latch 688 (Figs. 17 and 35), pivotally mounted on the framing of the machine, also normally holds blocking lever 686 in counterclockwise position. Latch 688 is spring biased in a counterclockwise direction and normally underlies an inwardly bent lug at the forward end of blocking lever 686 thus holding said lever from clockwise movement. However, in the drawings, latch 688 is shown in its disengaged position. Latch 688 has a rearward extension provided with an outwardly disposed shelf portion which rests upon the slotted end of arm 669. When toggle 662—663 is broken and arm 669 moved forwardly the slotted end thereof is raised, thus moving latch 688 clockwise (Fig. 17) to release blocking lever 686. However, as hook 680 is some distance above arm 663′, the clearout cycle for wheels 13 and 85 is initiated, as described, before toggle 662—663 is broken to initiate either registration or carriage shift. Accordingly, slide 480 is moved toward the front of the machine (Fig. 16) when detent 487 is rocked to allow engagement of clearout clutch 484, and stud 491 is moved to position above the nose of blocking lever 686. Therefore, when blocking lever 686 is released by latch 688 as toggle 662—663 is broken, said lever is allowed only a slight degree of clockwise movement as the upper edge of the nose thereof will be brought into restraining contact with stud 491 (Fig. 17). However, as the clearout cycle is completed, slide 480 will be returned to the rear of the machine and stud 491 will be removed from engagement with blocking lever 686. Therefore, lever 686 will be allowed further clockwise movement until the forward end thereof is brought to rest upon arm 687. In this position the nose at the rear of said lever 686 is raised into position in front of stud 491.

As toggle 662—663 is broken, slide 658 is moved toward the rear of the machine to contact pin 489 of clutch lever 111. However, slide 658 will be ineffective at this time to move clutch lever 111 from its neutral position, for when detent 487 is rocked to allow engagement of clearout clutch 464, the open end slot of extension 488 thereof is brought into engagement with pin 489 of said clutch lever, thus holding it in neutral position (Fig. 16). Nevertheless, when the clearout cycle is completed, detent 487 and thus extension 488 will be rocked clockwise, thus releasing clutch lever 111. Accordingly, spring 665 will rock lever 664 further in a clockwise direction thus moving slide 658 further to the rear and clutch lever 111 into its plus position.

In order to free the product-dividend register 13 from its intermediate gears during a clearout operation, the clearout means is designed to rock the carriage upwardly, about shaft 459 as a center. As has been described, bails 640 and 641 are held in counterclockwise position (Fig. 29) by fingers 543 when there is a multiplier set in storage gears 540. It will be seen therefore that when the front of carriage 2 is raised, during the clearout cycle, fingers 543 will be raised above bails 640—641 thus allowing said bails to be spring urged back in clockwise direction. It will thus be seen that when carriage 2 is lowered at the completion of the clearout cycle, fingers 543 will be ineffective to rock bails 640—641 back in counterclockwise direction and a jam would result. Accordingly provision is made to maintain bails 640—641 in or to move them to counterclockwise position during the clearout cycle as follows:

When clearout clutch 464 is cycled and link 496 (Fig. 24) is moved to the rear to rock arm 497, a spring 692 attached to link 496 provides yieldable connection by means of a slotted member to pin 656′ of blocking member 656 and thereby rocks said blocking member clockwise if it is in counterclockwise position. Therefore, as described, blocking member 656, through the connected parts, will rock bail 640 counterclockwise and by pin 641′ will also rock bail 641 (Fig. 29). Furthermore, if blocking member 656 is in clockwise position and pin 656′ is thus at the rear of the slot in the slotted member attached to spring 692, spring 692 will move said slotted member to the rear to bring the forward end of the slot therein into contact with pin 656′. Thus it will be seen that the blocking member 656 will be held in clockwise position during the clearout cycle.

When toggle 662—663 is broken by hook 680, as described, and the units order storage gear 540 contains a value, thus positioning blocking member 656 in clockwise position (Fig. 17), lever 671 will be ineffective to move link 672 toward the front of the machine to initiate a carriage shift upon engagement of clutch lever 111. Therefore, when clutch lever 111 is moved to plus position, following the clearout cycle, plus registration is initiated. Furthermore, upon breaking of toggle 662—663 toggle link 662 is rocked in a counterclockwise direction (Fig. 16) and thus link 682 connected thereto is moved toward the rear of the machine.

During the first half cycle of registration, shaft 636 will be rocked clockwise by rock arm 22—22′ (Fig. 35, and counterclockwise, Fig. 2). Therefore, trip arm 638 (Figs. 2 and 28) which is in lowered position will be moved toward the rear of the machine by crank 637 on shaft 636. As trip arm 638 is moved toward the rear of the machine, the shoulder thereof is brought into contact with arm 639′ of cam lever 639 thus rocking said cam lever in a counterclockwise direction (Fig. 26). Cam lever 639 thus moves keyboard clearout slide 478 toward the left of the machine, thereby moving latch 482 clockwise and releasing slide 480. Slide 480, however, at this time is only allowed sufficient forward movement to prevent reengagement of latch 482 therewith as the nose of latch lever 686 being in the path of movement of stud 491 will prevent further movement of said slide 480 (Fig. 35). Accordingly, it will be seen that detent 487 is not moved sufficiently to allow engagement of clearout clutch 464, but as latch 482 is disengaged said clearout clutch will be engaged when blocking lever 686 is removed from engagement with stud 491 on slide 480 at the end of the calculation. When the calculation is completed, the keyboard clearout cycle, and the carriage return is effected as follows:

The keyboard clearout cycle is initiated when the nose of latch 686 is removed from blocking engagement with stud 491 on slide 480 and the operation is effected by the restoration of shaft 591 to normal at the conclusion of the calculation as previously described. When shaft 591 is rocked to normal, arm 687 fixed thereon, will rock latch lever 686 counterclockwise from the position shown in Fig. 35 into latching engagement with latch 688. Accordingly, the nose at the rear of latch 686 will be lowered from engagement with stud 491. Slide 480 will now be free to move toward the front of the machine. Therefore when clutch lever 111 is moved to neutral and pin 489 thereon is brought into registration with the slot of extension 488 of arm 485 (Fig. 16), said arm fixed on shaft 486 will be moved counterclockwise and thus move detent 487 to allow engagement of clearout clutch 464. Thus a keyboard clearout cycle is initiated, the setting of which was effected at the start of the multiplication as described.

The keyboard clearout cycle serves to initiate the carriage return to the left, the setting for which was effected, as described, upon depression of multiplier key 587. As fully disclosed in my co-pending application Serial No. 8,547, arm 605 (Figs. 8 and 19) is rocked clockwise and back counterclockwise during a clearout cycle. Therefore in accordance with the operation described in the aforesaid co-pending application, left shift key 370 is depressed as arm 605 is rocked counterclockwise in its return movement, and thus a left carriage shift is initiated.

Upon depression of left shift key 370, lever 368 attached thereto is rocked in a counterclockwise direction and by contact with a rearwardly extending arm of latch 609 will thereby rock said latch clockwise (Fig. 19) thus moving said latch from beneath lug 610 of lever 598. Also, as the keyboard clearout cycle is completed, clearout slide 478 will be restored, thus restoring bell crank 474 and allowing clockwise movement of lever 612 whereby latch 611 is also moved from beneath lug 610 of lever 598. Therefore, lever 598 is released to rest upon the outwardly extending arm of rocker 597 (Fig. 19). When carriage 2 has been shifted to the extreme left hand position, the operation is terminated and the parts restored to normal, all as disclosed in the aforesaid co-pending application Serial No. 8,547.

*Multiplier constant*

When the same multiplier is to be used a number of times in succession, provision is made for the automatic return of the multiplier set in storage wheels 524 and gears 540 after the wheels and gears have been counted back to zero at the conclusion of the calculation. This constant mechanism, per se, is disclosed in my co-pending application, Serial No. 8,547, filed of even date herewith. According to the present disclosure provision is made, upon the setting of lever 696 (Figs. 1, 8, 36 and 37) after a multiplier setting is effected, whereby the keyboard clearout cycle which follows the calculation will effect the return of the multiplier to the storage devices as follows:

Multiplier storage wheels 524, gears 536 fixed thereon, and gears 537 having spring connections 538 therewith (Figs. 4 and 6) are normally adapted to be rotated as units. The ends of centralizing springs 538 have driving attachment respectively with pins extending inwardly from wheels 524 and gears 537. As viewed in Fig. 6, wheels 524 and gears 537 are biased in clockwise and counterclockwise directions respectively with the pins thereof in restraining engagement. It will be apparent, therefore, if gears 537 are held against rotation, wheels 524 may be moved in counterclockwise direction, thus adding tension to springs 538, and that if then wheels 524 are released, springs 538 will drive said wheels back in clockwise direction to their original setting. To lock gears 537 against rotation, a comb 697 (Figs. 3, 36 and 37) is adapted to be moved into locking engagement with gears 537 upon setting of lever 696 after a multiplier has been set in the storage devices.

Comb 697 mounted in carriage 2 extends longitudinally thereof and is located to the rear of gears 537 and above storage gears 540 (Figs. 3, 36 and 37). As most clearly seen in Fig. 37, comb 697 is provided with teeth 697' which are normally located to the right rear and out of contact with gears 537. The leftmost end of comb 697 extends outwardly through a suitable slot in the end plate of carriage 2 and is there provided with an open end slot extending to the rear at an angle toward the right of the forward edge of the comb. A guide pin 698 secured by a suitable bracket to the end plate of carriage 2, extends downwardly through the slot in comb 697 and the comb is held in normal position by arms 699 and 700 which extend upwardly on either side of the end of comb 697 and are provided each with an ear to which is attached the respective end of a spring 701. Spring 701 biases arms 699—700 toward each other so that they are normally in contact with either side of a stop 702 comprising the inwardly turned lug of a plate fast on the end of shaft 527. Thus comb 697 is normally located in the position indicated in Fig. 37 with the teeth 697' out of engagement with gear 537.

The rightmost end of comb 697 is pivotally mounted and supported on a lever 703 (Figs. 36 and 37) which is fulcrumed on a suitable bracket attached to a partition plate of carriage 2, to the left of and in spaced relationship to plate 531. It will be apparent, therefore, from an inspection of Figs. 36 and 37, that if lever 703 is rocked in a clockwise direction, the right end of comb 697 will be moved forward and toward the left, and that guide pin 698, in registration with the angularly disposed slot, will afford equivalent movement at the left end of the comb. The movement of comb 697 will therefore rock arm 700 clockwise as shown in Fig. 38, against the tension of spring 701. Thus the teeth 697' of comb 697 will be moved into engagement with gears 537, thereby locking said gears against rotation.

Lever 696 is pivotally mounted on shaft 705, on which product-dividend wheels 13 are also mounted, and is provided with an upstanding arm 696' (Figs. 36 and 37) which is adapted for engagement with a cam edge at the rear of lever 703. Thus when lever 696 is adjusted toward the front of the machine to its effective position, arm 696' will rock lever 703 clockwise and thereby move comb 697 toward the front and left of the machine and therefore move teeth 697' into locking engagement with the respective gears 537.

Lever 696 is further provided with a rearwardly extending arm on which is mounted pin 706 extending to the right thereof. Pin 706 is adapted for engagement with either of two indents in a plate 531 (Figs. 8 and 37) and is thereby held in either of its adjusted positions.

Storage gears 540 and wheels 524 will be held in their successive positions by pawls 693 as they are successively counted back to zero during the calculation. It will, therefore, be apparent that as gears 537 are held against rotation, springs 538 will be further tensioned, thus biasing wheels 524 and gears 540 in reverse direction. The keyboard clearout cycle following the calculation serves to raise carriage 2, as was described in connection with the clearout mechanism. When carriage 2 is raised, provision is made to rock shaft 527, thereby removing pawls 693 from restraining engagement with gears 540 in the following manner:

Crank 707 (Figs. 20, 25, 36 and 37) is splined on shaft 527 and extends forwardly between two spaced plates 708 which are mounted on and extend upwardly from the left hand side frame. Plates 708 are provided with a pin extending therebetween and through an open end slot in the end of crank 707. Crank 707 is, therefore, held against lateral movement by plates 708 when carriage 2 is shifted. However, when carriage 2 is raised in the keyboard clearout operation, the pin in engagement with the slot of crank 707 will hold the forward end of the crank from upward movement. Therefore, as shaft 527 is raised with carriage 2, crank 707 will be rocked counterclockwise (Figs. 25 and 37) and due to the splined connection with shaft 527 will rock the shaft in like direction.

As shaft 527 is rocked in accordance with the foregoing, cams 695 splined thereon will be rocked clockwise (Fig. 5) to the position shown therein and into contact with pawls 693, thereby rocking the pawls out of engagement with storage gears 540. As described in connection with the clearout operations, bails 640—641 are rocked counterclockwise (Fig. 29), thus allowing fingers 543 to be moved from engagement with the recesses 542 of the hubs 541 of storage gears 540. Therefore, as storage gears 540 are freed from restraint by pawls 693 and fingers 543, springs 538 will drive storage wheels 524 clockwise and storage gears 540 counterclockwise (Fig. 3) to their original settings. It will be apparent that when carriage 2 is lowered to its normal position at the end of the clearing operation, shaft 527 will be rocked back to normal, thus allowing pawls 693 to be moved back into engagement with storage gears 540. Also bails 640—641 will be moved into contact with fingers 543 thus urging them into engagement with hubs 541 of the storage gears. When constant lever 696 is moved back to normal, arm 696′ thereof will be removed from contact with lever 703. Arm 700 (Fig. 38) in contact with the end of comb 697 and biased in counterclockwise direction by spring 701, will, therefore, move comb 697 to its normal position from engagement with gears 537.

When constant lever 696 is in normal unset position, the operation of the clearout mechanism is also adapted to move comb 697 into locking engagement with gears 537 for reasons in connection with a multiplying program initiated by multiplier key 587 (Fig. 1). A program of multiplication initiated by key 587 includes a clearout operation preceding the calculation. It will be apparent, therefore, that when carriage 2 is raised during the clearout operation, shaft 527 and cams 695 (Fig. 25) will be rocked, thereby moving pawls 693 from engagement with storage gears 540, and also bails 640—641 (Fig. 29) will be moved, thereby releasing fingers 543 from engagement with hubs 541 of the storage gears. As shaft 527 is rocked, plate 702 fixed to the end thereof will also be rocked clockwise from the position shown in Fig. 38. The lug of plate 702 will, therefore, rock arm 700 clockwise and arm 699 will also be moved clockwise by spring 701, thus moving comb 697 and the teeth 697′ thereof into engagement with gears 537. When carriage 2 is lowered at the end of the clearout operation, pawls 693 and fingers 543 will be reengaged with the gears 540 and hubs 541 respectively. Thus, it will be seen that the storage devices will be prevented from moving their adjusted positions during the clearout operation.

*Division*

Division is effected by the well known subtract, add, shift method in which the divisor set on keyboard 10 (Fig. 1) is subtracted once more than it is contained in the corresponding portion of the dividend registered in product-dividend wheels 13. A negative numeral wheel reading is therefore obtained and the tens transfer mechanism will successively move wheels 13 from 0 to 9 as far toward the left as such transfer mechanism is provided. This transfer is utilized to trip control devices for terminating the subtractive operation, whereupon the actuating means is reversed and a single positive registration will occur. The excessive subtraction will therefore be corrected and the count corrected on wheels 85 of the multiplier-quotient register, thus leaving the proper quotient digit registered therein. The single positive registration will effect a second transfer thus moving the left hand wheels from 9 back to 0 to trip the control devices. Carriage 2 will thereupon be shifted one order to the left and subtractive actuation initiated, thereby resuming the sequence of operations.

A program of division is initiated upon depression of key 590 (Fig. 1), and the operation will continue until carriage 2 is shifted into its leftmost position. Upon completion of the subtractive and additive registrations to register the correct quotient digit in that position, the carriage shift mechanism is operated. However, as described in connection with the carriage shift mechanism, when said mechanism is operated and the carriage is in the extreme position of the indicated shift, the operation will be ineffective to move the carriage. The ineffective carriage shift operation is adapted to restore divide key 590 and thereupon the operation of the carriage shift normalizing devices following the shift operation is adapted to also normalize the division control devices which were set upon depression of divide key 590. Furthermore, upon normalization of the division control devices, a clearout operation for the keyboard is automatically initiated.

A stop key 618 (Fig. 1) is provided so that the division program may be terminated when the desired number of quotient digits have been computed. Depression of stop key 618 will restore divide key 590 and the machine will continue to calculate until the correct quotient digit is registered in that order, thereupon carriage 2 will be shifted one order to the left and the operation terminated without calculation in that order. The operation of the carriage shift normalizing devices following the shift will act to normalize the division control devices following which the keyboard clearout operation is initiated. Should stop key 618 be depressed during a carriage shift, no calculation will take place at the conclusion of the shift and the normalizing and keyboard clearing operations will immediately follow.

The devices heretofore described in connection with the control of multiplication are utilized in part and modified in operation to control the program of division.

Divide key 590 is held in adjusted position by a lever 719 (Figs. 20 and 28) which is pivotally mounted upon a bracket secured at the front of the keyboard. The stem of divide key 590 is provided with two spaced lugs at the rear, and the rightwardly extending arm of lever 719 is positioned therebetween. The ends of a toggle spring 720 (Fig. 28) are attached to the rightmost end of lever 719 and to a pin fixed in a bracket at the front of the keyboard. Thus lever 719 is biased in counterclockwise direction (Fig. 28) thereby holding divide key 590 in raised position. However, when the divide key is depressed, lever 719 is rocked clockwise thereby and the lever is then biased clockwise by spring 720, thus holding key 590 in set position. A stop key 618 (Figs. 1, 20 and 28) is positioned to the left of the divide key and is held in normal raised position by a suitable spring. The stem of stop key 618 is provided with a lug which extends to the rear and to a position above the leftwardly extending arm of lever 719. Therefore, when lever 719 is rocked clockwise upon depression of the divide key, the leftward arm of the lever will be raised to a position immediately adjacent the lug at the rear of the stop key. Accordingly, upon depression of the stop key, the lug thereon will contact and rock lever 719 in counterclockwise direction thereby restoring divide key 590.

The stem of divide key 590 is attached at its lower end to a crank which is attached to the rightmost end of a bail 721 (Figs. 14 and 28) which is pivotally mounted on shaft 591. Bail 721 extends to the left of the left hand side frame of the machine and is there provided with an upstanding arm to which is attached the forward end of a link 722 (Figs. 14 and 24). Link 722 extends toward the rear of the machine, where it is attached to one arm of a bell crank 723 (Fig. 14). Bell crank 723 is pivotally mounted on the framing of the machine, and attached to the other arm thereof is link 724 (Figs. 14 and 24) which extends upwardly and is provided with a guide slot at its upper end. A pin mounted on the left hand side frame of the machine extends through the slot in link 724 and thereby positions the upper free end of the link adjacent the rear of carriage 2. When divide key 590 is depressed, bail 721 is thereby rocked clockwise (Fig. 14) and therefore link 722 will be moved toward the front of the machine. Bell crank 723 will therefore be rocked counterclockwise and link 724 raised to the position shown in Fig. 14.

Link 722 is provided with a pin 722' (Figs. 14, 16 and 24) which is adapted for operation in connection with latches 456 and 725. Latch 456 normally connects arms 454 and 455 so that when the two phase clutch 371 is operated following the termination of a carriage shift, the two arms will be rocked in unison in a clockwise direction and thereby move arm 24 (Figs. 11, 14 and 16) against the fixed stop 29 to centralize clutch lever 111. As described in connection with a program of multiplication, the normal operation of arms 454—455 is essential to the operation. However, in the performance of the division program, as will appear, arm 24 must not be moved against stop 29 following a carriage shift. Therefore, provision is made to disable the connection between arms 454—455. However, prior to the final operation of clutch 371 in the program, latch 456 is reengaged for the performance of certain normalizing operations to be described later. Accordingly, when link 722 is moved toward the front of the machine, upon depression of divide key 590, latch 456 will be moved in counterclockwise direction, against the tension of a spring, to the position shown in Fig. 14 by engagement of pin 722' with a depending arm thereof. Thus latch 456 is moved from the path of a pin on arm 454 so that arm 455 will not be rocked with arm 454 upon operation of clutch 371.

Latch 725 (Figs. 14 and 24) pivotally mounted on the framing of the machine, is normally in engagement with a roller on an arm of a crank 726, fixed on shaft 616 which extends across the machine and is pivotally mounted in, and extends outwardly from the side frames thereof. A spring 728 is attached to an upstanding arm of another crank 729 (Fig. 14) which is fast on shaft 616 thus biasing the crank in clockwise direction. When latch 725 is in normal engagement with the roller of crank 726 (Fig. 24), shaft 616 is held in counterclockwise position against the tension of spring 728 (Fig. 14). Latch 725 is normally in contact with pin 722' of link 722 and therefore when link 722 is moved toward the front of the machine, pin 722' will move latch 725 counterclockwise and out of engagement with the roller of crank 726 (Fig. 14). Accordingly, spring 728 will rock crank 729, shaft 616 and crank 726 in a clockwise direction to the position of the parts shown in Fig. 14. Another crank 732 is also fixed on shaft 616 and extends upwardly therefrom. The rearward end of a forwardly extending link 733 is attached to crank 732, and as the crank is rocked with shaft 616, link 733 operates to effect certain adjustments and to initiate the division program as will be described later.

Crank 726 is provided with a forwardly extending arm (Figs. 14 and 24) on which a link 730 is pivotally mounted at its lower end. Link 730 is provided with an upper open end slot through which extends a pin mounted on the forwardly extending arm of a lever 731. Lever 731 is adapted for operation in connection with the carriage shift devices in the program of division and is fulcrumed on link 424 (Fig. 24). When crank 726 is in its normal counterclockwise position (Fig. 24), link 730 is in raised position and thus lever 731 is held in counterclockwise or ineffective position. However, when crank 726 is rocked clockwise, link 730 is lowered and therefore lever 731 is allowed clockwise movement (effected by a suitable spring) to its effective position as shown in Fig. 14.

When shaft 616 is rocked upon depression of the divide key, the setting which provides for the keyboard clearout cycle following the calculation is effected by crank 635 (Fig. 28) fixed on the shaft. A link 634 (Figs. 2 and 28) has pin and slot connection at its rearward end with crank 635 and at its forward end is attached to an arm of crank 623 on shaft 591. Arm 22 (Fig. 24) is fast on shaft 636 which extends between the side frames of the machine, and fixed thereon is a depending crank 637 (Figs. 2 and 28) to which is pivoted the rearward end of a trip arm 638. Arm 638 extends forwardly and is provided with a shoulder and a lug extending to the left (Fig. 28) at the free end thereof. The lug of trip arm 638 rests upon link 634 and the shoulder of the trip arm normally is positioned just above the rightwardly extending arm 639' of cam lever 639 (Figs. 2 and 27). Trip arm 638 is guided by the slot in bracket 621 as shown in Fig. 2. In the exploded perspective (Fig. 28), however, the trip arm is shown displaced from the bracket 621 and arm 639'. Cam lever 639 which has a common fulcrum with cam lever 624 is adapted for contact with a roller on keyboard clearout slide 478. Accordingly, when shaft 616 is rocked counterclockwise (Figs. 2 and 28), crank 635 will lower link 634 and thus lower the forward end of trip arm 638 to bring the shoulder of the trip arm in front of arm 639' of cam lever 639. Upon the first registering cycle of the machine, shaft 636 will be rocked counterclockwise (Figs. 2 and 28) by arm 22 (Fig. 24) and thus move trip arm 638 toward the rear of the machine. The shoulder of trip arm 638 will therefore contact arm 639' and rock cam lever 639 counterclockwise (Fig. 26). Cam lever 639, by contact with the roller on slide 478, will move said slide toward the left of the machine, thereby moving latch 482 clockwise and releasing slide 480. Slide 480 is provided with a shoulder 736 (Figs. 14 and 16) and when crank 729 (Fig. 14) was rocked clockwise, as described, an inwardly turned lug 729' at the free end of an arm thereof was moved to position a short distance in front of the shoulder 736 of slide 480 as shown in Fig. 14. Slide 480 is therefore allowed, at this time, only sufficient forward movement to prevent reengagement of latch 482 therewith. Accordingly, it will be seen that detent 487 is not moved sufficiently to allow engagement of clearout clutch 464, but as latch 482 is disengaged the clutch will be engaged when blocking lug 729' is removed from engagement with the shoulder 736 of slide 480 at the end of the calculation as will be described.

The blocking member 656, latch lever 678 and lever 671 (Figs. 14, 16, 17 and 24), which operate in connection with the carriage shift devices during the program of multiplication, are set to an ineffective position by link 733 during the program of division. The forward end of link 733 is provided with an open end slot whereby the link is slidably supported on a collar on shaft 646 (Figs. 14 and 15) on which blocking member 656 is mounted. A roller 737 mounted on blocking member 656 is in abutment with the substantially vertical face of the end of link 733 when the blocking member is biased in normal counterclockwise direction by spring 657, as shown in Fig. 15. However, when link 733 is moved toward the front of the machine, blocking member 656 is moved in clockwise direction by the face of link 733 in contact with roller 737 until the horizontal edge of an indent in the face of the link is moved above the roller (Fig. 14). The indent provides for further movement of link 733 to initiate the division program after the proper settings are effected.

With reference to Fig. 17, it will be seen that when blocking member 656 is rocked in accordance with the foregoing, it will be out of position to block the lower end of lever 671. Therefore, lever 671 will be ineffective to initiate a carriage shift when toggle 662—663 is broken. Also, blocking member 656 will move link 679 downwardly, thus rocking latch lever 678 to a position ineffective to latch shift initiating link 672 when moved forward to initiate a carriage shift during the division program to be described. Furthermore, control plate 661 is adjusted to its minus setting (Fig. 39) when blocking member 656 is rocked by link 733. Control plate 661 is normally held in clockwise position against pin 656' of blocking member 656 by spring 690. Therefore, when member 656 is rocked clockwise, plate 661 is rocked therewith to the position shown in Fig. 39.

An upstanding finger 733' of link 733 (Figs. 14 and 15) is normally in contact with an inwardly turned lug at the lower edge of plate 675. Therefore, as link 733 is moved forwardly, plate 675 will be moved in counterclockwise direction, thereby lowering trip arm 685 (Fig. 24) to effective position and as the link reaches the extent of its forward travel, hook 680 mounted on plate 675 (Fig. 14) will contact the upper end of toggle link 663, thereby breaking toggle 662—663. Accordingly, slide 659 (Fig. 40) will be moved to the right, thus initiating minus registration. Furthermore, as link 733 is moved to its forward position, a pin 738 (Figs. 14 and 15) mounted at the forward end of the link and extending outwardly therefrom, will be moved into position for operation in connection with a latch 739 (Figs. 39, 40, 41 and 42) which is pivotally mounted on a plate 740.

Plate 740 is located to the front of control plate 661 and is pivotally mounted on shaft 646. Latch 739 is mounted on plate 740 forwardly of shaft 646. A spring 741 (Figs. 39–42) is attached at one end to a lug on latch 739 and at the other end to a pin mounted in control plate 661. Thus it will be seen that plate 740 and latch 739 are normally held in clockwise position (Fig. 39) as a unit relative to control plate 661, with plate 740 in contact with pin 742 mounted on plate 661. Accordingly plate 661, plate 740 and latch 739 are normally adapted to be rocked as a unit on shaft 646. Furthermore, the lug on latch 739 is positioned forwardly of the pivotal point of the latch on plate 740 and thus latch 739 will normally be held in counterclockwise position against a collar on shaft 646 (Fig. 39).

A rearwardly extending arm of plate 740 is provided with a cam edge 740'. Cam edge 740' normally lies at an angle to and intersects the plane of the lower edge of the rear wing of control plate 661, as shown in Fig. 39. Accordingly, when control plate 661 is rocked clockwise to its minus position, cam edge 740 will be moved into contact with lug 659' of slide 659. Therefore when toggle 662—663 is broken and slide 659 is moved to the right (Fig. 40) to initiate minus registration, lug 659' will be moved below the lower edge of the left wing of control plate 661 and will, by contact with cam edge 740', move plate 740 in a counterclockwise direction against the tension of spring 741 until the lug passes beyond the cam edge and above the arm of plate 740. Thus latch 739 will also be moved counterclockwise with plate 740 until the hooked end of the latch is brought into contact with pin 738. Upon further counterclockwise movement of plate 740, latch 739 will be moved by contact with pin 738 a sufficient distance clockwise about its pivot to allow its hooked end to move above the pin and then it will be moved back counterclockwise by spring 741 to latched position above the pin (Fig. 40).

It will be noted at this point that spring 741 normally serves to locate plate 661, plate 740 and latch 739 in their relative positions with plate 740 held against stop pin 742, mounted on plate 661 (Fig. 39). However, spring 741 is sufficiently strong to overcome the tension of spring 690 which holds control plate 661 in its clockwise minus position. Therefore, when plate 740 is rocked counterclockwise by lug 659' (Fig. 40), plate 661 will be urged by spring 741 to move counterclockwise with plate 740. However, lug 659' has been moved below the lower edge of the rear wing of control plate 661 and therefore the plate is held from counterclockwise movement at this time. Nevertheless, during the first half cycle of registration, as was described in connection with a program of multiplication, toggle 662—663 will be reset and accordingly slide 659 will be restored to its normal position thereby removing lug 659' from beneath the edge of the rear wing of control plate 661 (Fig. 41). Also, lug 658', which prevented rearward movement of slide 658 by contact with the forward wing of the control plate, will be moved from engagement therewith. Thus control plate 661 will be rocked to its plus position (Fig. 41) by spring 741, which overcomes the tension of spring 690. Control plate 661 is blocked from further counterclockwise movement by contact of pin 742 with plate 740. Thus it will be seen that plates 661 and 740 have been moved to their normal relative positions, but plate 740 is held in counterclockwise position by latch 739 and thus control plate 661 is held in its plus position.

The machine will register subtractively until a negative numeral wheel reading is obtained. The left-most intermediate gear 545 (Figs. 11, 14 and 24) is located to the left of the left hand side frame and therefore out of range of the digital actuators. However, the tens transfer actuators are extended to the left to include the leftmost gear 545. Therefore when a negative numeral wheel reading is obtained, a tens transfer extending to the left will be effected and the leftmost intermediate gear 545 will be moved one step. A lever 31' (Figs. 11, 14 and 24), pivotally mounted on the side frame, has slot and pin connection with trigger 31 and the leftwardly extending arm of the lever is provided with a nose which is normally seated between the teeth of leftmost gear 545. Therefore when gear 545 is moved one step, lever 31' and trigger 31 will be rocked counterclockwise, thereby releasing pawl 25. The subtractive registration will therefore be terminated and arm 24 (Fig. 11) carried by arm 22 to the fixed stop 29.

When arm 24 (Fig. 11) is carried to the fixed stop 29, extension 144 of the arm will operate to move clutch lever 111 to its central position. Trip arm 685 (Fig. 24) will be carried forward by arm 24 and thus contact arm 663' of toggle link 663 thereby breaking toggle 662—663. As control plate 661 has been set to its plus position (Fig. 41), lug 658' will be moved beneath the lower edge of the forward wing of control plate 661 (Fig. 42) as slide 658 (Fig. 16) is moved to the left to contact pin 489 on clutch level 111. Therefore, as arm 24 rebounds from fixed stop 29, extension 144 will be removed from restraining engagement with pin 145 of clutch lever 111 and slide 658 will then operate to move the clutch lever into its plus position. A single additive cycle of registration will thus be initiated to correct the overdraft on wheels 13 and the quotient on wheels 85.

It will be noted that lever 731 (Figs. 14 and 24) mouned on link 424 is adapted to operate in connection with a lug 672' extending outwardly from shift initiating link 672. Lever 731 is biased in clockwise direction by a suitable spring. However, when arm 24 is in normal position, link 424, on which lever 731 is mounted, is toward the rear of the machine, thus holding lever 731 in counter-clockwise position by contact with a stud fixed on the framing of the machine as seen in Fig. 14. Lever 731 is provided with a shoulder at its forward end which is adapted for contact with lug 672' indicated by the dot-dash lines in Fig. 14. When arm 24 is moved toward the fixed stop 29, link 424 and lever 731 will be moved toward the front of the machine. Lever 731 will therefore be moved away from the restraining stud to afford the lever clockwise movement whereby the shoulder thereof, normally positioned above lug 672' will be moved into contact therewith. However, when the machine is operating in subtractive registration crank 20 (Fig. 14) is rotated in a counterclockwise direction. As arm 22 carries arm 24 to the fixed stop, the rearward end of link 21, attached to crank 20, will therefore be moved downwardly. A pin 21' (Fig. 14) mounted on link 21 will accordingly be moved into contact with a rearwardly extending arm of lever 731 and thus the lever will be restrained from clockwise movement when it is moved away from the fixed stud. The shoulder at the forward end of lever 731 will therefore be moved ineffectively above lug 672' of shift initiating link 672 (Fig. 24) and as heretofore described, registration will be initiated when toggle 662—663 is broken. Conversely however, when a plus registration is terminated, crank 20 will move in a clockwise direction and pin 21' will be raised out of position to contact the arm of lever 731. Therefore, as lever 731 is moved away from the fixed stud, it will be spring urged in a clockwise direction thus lowering the shoulder thereof into position to contact lug 672' and move link 672 toward the front of the machine, to initiate a carriage shift when toggle 662—663 is broken.

When lug 658' (Fig. 42) is moved beneath the lower edge of the forward wing of control plate 661 by slide 658, the lug will contact a depending tail of latch 739, thereby moving the latch in clockwise direction and thus out of engagement with pin 738. Spring 690 will now urge control plate 661, plate 740 and latch 739 as a unit in a clockwise direction. However, this movement is prevented at this time by lug 658' beneath the lower edge of the forward wing of the control plate. As heretofore described, upon the first half of the cycle of actuation, toggle 662—663 and slides 658—659 are restored, thus removing lugs 658' and 659' from engagement with control plate 661. Therefore control plate 661 is freed from restraint and accordingly spring 690 will move plate 661, plate 740 and latch 739 as a unit clockwise to the minus setting, as originally effected upon depression of the divide key (Fig. 39).

The single cycle of plus registration will move dividend wheels 13 from a negative to a positive reading and a tens transfer will be effected, thus moving the leftmost intermediate gear 545 (Fig. 24) one step thereby terminating the plus cycle as heretofore described. As arm 24 is carried to fixed stop 29 to terminate the plus corrective cycle, the shoulder of lever 731 (Fig. 14) will contact lug 672' and thus move link 672 (Fig. 11) toward the front of the machine. Therefore, as control plate 661 is in its minus setting, when toggle 662—663 is broken by trip arm 685 and arm 24 is returned from stop 29, a left carriage shift will be initiated. Link 672 (Fig. 11) will be immediately returned toward the rear of the machine by spring 674 when arm 24 returns from fixed stop 29 and therefore the carriage shift will be a single denominational step.

Two phase clutch 371 (Fig. 24) will be operated at the termination of the carriage shift whereby arm 454 is rocked in clockwise direction. However, arm 454 will be rocked independently of arm 455, as latch 456 is in disengaged position. Therefore arm 24 (Fig. 11) will not be carried to fixed stop 29 as in the normal operation of the carriage shift devices, and clutch lever 111 will not be centralized by extension 144. Accordingly, clutch lever 111 will remain in its minus position at the termination of the left carriage shift. Two phase clutch 371 in its operation at the conclusion of a carriage shift as described, disengages shift clutch 353 and reengages actuator clutch 352. Therefore as clutch 111 is in its minus position, minus registration will be effected upon reengagement of actuator clutch 352. The subtract, add, shift program will thus be continued until stop key 618 (Fig. 1) is depressed or until carriage 2 is shifted into the leftmost position.

Upon depression of stop key 618 (Fig. 24), divide key 590 will be raised by lever 719 to its normal position. Bail 721 (Fig. 14) will be rocked in counterclockwise direction as divide key 590 is raised and thus link 722 will be moved toward the rear of the machine, and link 724 lowered to its normal position. Pin 722' mounted on link 722 will accordingly be moved to the rear from the depending arm of latch 456 and the latch will be moved clockwise by its spring into the path of movement of the pin on arm 454 as shown in Fig. 24. The machine will be operated in its minus and plus cycles of registration and the single order of left carriage shift will be effected. However, when two phase clutch 371 is operated at the conclusion of the shift, arm 455 will be rocked clockwise with arm 454 as latch 456 is now in engaged position. A roller 455' (Figs. 14 and 24), shown in dotted lines and mounted on arm 455 at the pivotal point of latch 456, is in contact with the upper side of latch 725 when the latch is in the disengaged position and the lower side of the latch rests upon the roller of crank 726 from which it was disengaged upon initiation of the division program. Therefore, as arm 455 is rocked clockwise by clutch 371, roller 455' will rock latch 725 in a clockwise direction. The lower side of latch 725 bearing upon the roller of crank 726 will thus rock the crank in counterclockwise direction against the tension of spring 728 (Fig. 14) until at the end of the movement the end of latch 725 is brought into its normal holding position with the roller of crank 726.

As crank 726 is rocked counterclockwise to its normal position, link 730 will be raised thereby rocking lever 731 (Fig. 24) counterclockwise to its normal ineffective position. Shaft 616 to which crank 726 is fixed will also be rocked, and with it crank 732, to which link 733 is attached. Link 733 is therefore moved toward the rear of the machine to its normal position. As link 733 is moved toward the rear, finger 733' (Figs. 14 and 15) is moved away from the lug on plate 675, thus allowing the plate to be moved by its spring to normal position. Plate 675 will accordingly raise trip arm 685 (Fig. 24) to its ineffective position above arm 663' of toggle link 663. Also, the indent in the vertical face of link 733 will be removed from roller 737 (Fig. 15), thereby allowing blocking arm 656 to be rocked counterclockwise by spring 657 to its normal position and also allowing latch 678 to be lowered to effective position. Furthermore, as arm 455 is rocked by clutch 371, arm 424 (Fig. 24) will be moved toward the front of the machine thus carrying arm 24 (Fig. 11) to fixed stop 29, and extension 144 of arm 24 will therefore move clutch lever 111 to its central position. Trip arm 685 (Fig. 24) will be carried forward by arm 24, but is simultaneously being raised by plate 675 and will therefore be ineffective to trip toggle 662—663. Furthermore, as shaft 616 is rocked counterclockwise to its normal position, crank 729 (Fig. 14) will likewise be rocked and lug 729' thereof will be removed from blocking engagement with the shoulder of slide 480 (Figs. 14 and 16). Slide 480, which was unlatched during the first actuating cycle of the program, will therefore be moved toward the front of the machine thereby initiating the keyboard clearout cycle. Thus when arm 24 is returned from stop 29, the machine will be stopped in full cycle position with the various devices in normalized condition and the keyboard cleared. It will be seen from the operation described in the foregoing, that should stop key 618 be depressed during a carriage shift, the operation of two phase clutch 371 will effect termination of the program in the order to which the carriage is shifted without calculation in that order.

Should the machine be allowed to operate until carriage 2 is shifted into its leftmost position, the minus and plus registration will be effected in that order and an idle carriage shift initiated. As may be noted from Figs. 2 and 20, the spiral tooth of worm 358 is truncated at its ends and is continued by a partially channeled snail cam extension, being thus ineffective to move plunger 359 to the left beyond the worm. However, it will be seen that when the worm is rotated in the reverse direction the worm will be effective to move plunger 359 and hence carriage 2 toward the right. When worm 358 is operated for an idle left shift, plunger 359 will be raised from the bottom of the worm to the outer diameter thereof and this eccentric action utilized to restore the divide key as follows:

A lever 743 (Figs. 9 and 14) is fulcrumed on the back of carriage 2. Lever 743 is spring urged in a counterclockwise direction (Fig. 9) and a leftward extending arm thereof is in contact with the top of plunger 359. When carriage 2 is shifted into its leftmost position, the rightwardly extending arm (Fig. 9) is moved to position above and immediately adjacent link 724 (Fig. 14). When plunger 359 is raised by the eccentric action of worm 358, lever 743 will therefore be rocked in clockwise direction (Fig. 9) and thus the rightwardly extending arm thereof will depress link 724 (Fig. 14). Link 724 will rock bell crank 723 in a clockwise direction thus moving link 722 toward the rear of the machine. Bail 721 will be rocked counterclockwise by link 722 and thus divide key 590 will be raised to its normal position. Upon operation of the two phase clutch 371 at the conclusion of the idle carriage shift, the operation will therefore be concluded and the normalizing and keyboard clearout operations effected.

For subject matter herein disclosed and not claimed, reference is made to applicant's copending applications, Serial No. 8,544, relating to carriage tabulating means and shift direction control; Serial No. 8,545 relating to constant factor means; Serial No. 8,547 relating to multiplier and dividend entering means; and Serial No. 57,943 relating to product transfer means.

I claim:

1. In a calculating machine having a register, rotary differential actuators therefor, cyclic reversible drive means for said machine including a lever settable diversely to effect forward or alternative reverse rotation of said actuators by said drive means; and drive interrupting means operable to restore said lever; means for setting said lever including a toggle linkage, a tripping element operable in time with the interrupting means to break the toggle linkage, spring means thereupon operable to collapse said toggle linkage, two diverging links having a common pivotal connection with and movable relative to said toggle linkage, two slides oppositely movable by and each connected with one of said diverging links, each slide having at one end operating connection with the diversely settable lever and at the other end a lug, an adjustable control plate having oppositely extending blocking wings, a member operable to adjust said control plate to bring one or alternatively the other blocking wing thereof into the path of movement of the lug of the related slide, and a member operable by the drive means to restore said toggle linkage.

2. A calculating machine according to claim 1, wherein the adjusting member has yieldable connection with the control plate and the lever setting means includes a second alternatively effective adjusting member engageable to maintain the control plate in a given adjusted position.

3. In a calculating machine having a register comprising numeral wheels, clearing means operable to restore said numeral wheels to zero, a keyboard comprising settable digital value keys, clearing means operable to restore said keys from set position, differential actuators operable to register values set in said keyboard, and driving means for said actuators including a clutch; means for controlling a program of successive registrations including a toggle linkage, an actuator clutch engaging train operable by said toggle linkage, an operation key manipulable to break the toggle, and spring means thereupon operable to collapse said toggle; cooperating power driven means for operating the register and the keyboard clearing means including a cyclic clutch, a master clearout train operable thereby, a normally restrained spring operated clutch engaging lever train releasable by said operation key to effect a first cycle of said clutch, a latch operable by the clearout clutch engaging train to prevent substantial movement of the actuator clutch engaging train, means operable upon disengagement of said clearout clutch to release said latch, an arm operable by the actuator driving means to restore the toggle, a trip arm operable by the actuator driving means to release the clearout clutch engaging train, a blocking lever, a spring biasing said blocking lever into the path of movement of the clearout clutch engaging train, a latch normally holding said blocking lever inactive, connections operable by the toggle linkage to release the latch, connections operable upon restoration of the operation key to move the blocking lever out of blocking engagement with the clearout clutch engaging train to effect a second cycle of said clutch, and coupling devices adjustable to hold the register clearing means in engagement with the master clearout train during the first cycle of the clearout clutch and to hold the keyboard clearing means in engagement with said train during the second cycle of said clutch.

4. A calculating machine according to claim 3, wherein the cooperating means includes a plurality of slides each operable to release the clearout clutch engaging train, one of said slides being operable by the operation key and having operating connection with the register clearout coupling device, and another of said slides being operable by the trip arm and having operating connection with the keyboard clearout coupling device.

5. In a calculating machine having a register, rotary differential actuators therefor, cyclic reversible drive means for said machine including a lever settable diversely to effect forward or alternative reverse rotation of said actuators, and cycle interrupting means; means for controlling a program of successive registrations including a toggle linkage, an arm operable in time with the interrupting means to break the toggle linkage, spring means thereupon operable to collapse the toggle linkage, two diverging links connected with said toggle linkage, two slides oppositely movable by and each connected with one of said diverging links, each slide having at one end operating connection with the diversely settable lever and at the other end a lug, an adjustable control plate having oppositely extending blocking wings, a second plate, a latch mounted on said second plate and having spring connection with the control plate, a member settable into position to be engaged by said latch to hold the control plate in a given position, a spring biasing the control plate to an opposed position, said second plate and said latch being alternately engageable by the one and the other free slide, upon breaking of the toggle, to effect alternate adjustment of the control plate to bring one and thereafter the other blocking wing thereof into the path of movement of the related slide and a member operable by the drive means to restore said toggle linkage.

6. In a calculating machine having a transversely shiftable carriage, a register thereon, differential actuators for said register, carriage shift devices, a power drive train including a prime mover and alternatively engageable cyclic actuator drive and carriage shift transmission elements, drive coupling and reversing devices interposed in said train between said prime mover and said transmission elements, and drive interrupting means operable to disconnect said drive coupling and reversing devices; means for controlling a program of successive registrations including a toggle linkage, a tripping element operable in time with the drive interrupting means to break the toggle linkage, spring means thereupon operable to collapse said toggle linkage, a setting member movable upon collapse of said toggle linkage, a control train between said setting member and the actuator drive and shift transmission elements alternatively adjustable to control the engagement of said elements respectively, an adjustable blocking member, means for adjusting said blocking member into and out of the path of movement of said setting member to control the adjustment of said control train, a pair of setting trains between the toggle linkage and the drive coupling and reversing devices oppositely movable upon collapse of said toggle linkage, an adjustable control plate having blocking surfaces, means for adjusting said plate to bring the blocking surfaces thereof into and out of or alternatively out of and into the paths of movement of one and the other of said setting trains respectively to effect forward or alternatively reverse drive, and a member operable by the drive train to restore the toggle linkage.

7. A calculating machine according to claim 6 wherein the means for adjusting the blocking member comprises multiplier value storage wheels and connections between said wheels and said blocking member operable to adjust said member in response to the angular positions of the wheels and wherein the means for adjusting the control plate includes yieldable connection with the blocking member.

8. A calculating machine according to claim 7 wherein the drive interrupting means includes means operable to interrupt a registering operation and means operable to interrupt a carriage shift operation and wherein the tripping element for breaking the toggle linkage comprises an arm operable by an element of the registration interrupting means; said element having operating connection with the shift interrupting means.

9. A calculating machine according to claim 8 having spring means for biasing the control train between the setting member and the actuator drive and shift transmission elements to actuator drive engaging position and wherein the setting member comprises a lever having connection with the toggle linkage and with the control train; said lever being ineffectively movable upon collapse of said toggle or alternatively blocked from such movement by the blocking member and thereupon effectively movable to adjust said control train to shift drive engaging position, and having a latch controlled by said blocking member to hold said control train in the shift drive engaging position against the tension of said spring means.

10. A calculating machine according to claim 9 wherein the program controlling means includes means settable to disable the blocking member and the latch.

11. A calculating machine according to claim 10 including means operable by the register to initiate operation of the registration interrupting means and wherein the program controlling means includes an operation key manipulable to set the means for disabling the blocking member and the latch, and having means settable by the operation key to disable the connection between the shift interrupting means and the element of the registration interrupting means.

12. A calculating machine according to claim 11 wherein the program controlling means includes a plurality of operating keys, a plate normally holding the toggle trip arm inoperative and adjustable by said keys respectively to release the arm, and a member mounted on and acting upon adjustment of said plate to break the toggle linkage.

13. In a calculating machine having a transversely shiftable carriage, a register thereon, carriage shifting means including a clutch, differential actuators for said register, driving means for said actuators including a clutch, lever devices operable to engage the actuator clutch or alternatively the carriage shift clutch, means operable to interrupt a registering operation, means operable to interrupt a carriage shift operation, multiplier storage wheels, and a counting finger operable during registration to retract a given storage wheel step by step; means for controlling a program of successive registrations including a toggle linkage, a trip arm operable by the registration interrupting means and alternatively by the carriage shift interrupting means to break the toggle linkage, spring means thereupon operable to collapse the toggle linkage, a setting member movable upon collapse of said toggle linkage, a control train between said setting member and the clutch lever devices alternatively adjustable to control the engagement of the actuator drive and carriage shift clutches respectively, a blocking member adjustable into and out of the path of movement of said setting member to control the adjustment of said control train, operating connections between the blocking member and the registration interrupting means, operating connections between the blocking member and the shift interrupting means, a bail adjustable in response to the angular position of the storage wheel related to the counting finger, operating connections between said bail and the blocking member, and a link operable alternatively by the actuator driving means and by the carriage shifting means to restore the toggle.

14. A calculating machine according to claim 13, wherein the program controlling means includes a second bail adjustable in response to the angular positions of a series of the multiplier storage wheels, and connections operable by said bail to disable the trip arm operable to break the toggle linkage.

15. In a calculating machine having a transversely shiftable carriage, a register thereon, carriage shifting means including a clutch, a keyboard comprising settable digital value keys, clearing means operable to restore said keys from set position, differential actuators operable to register values set in said keyboard, driving means for said actuators including a clutch, lever devices operable to engage the actuator clutch or alternatively the carriage shift clutch, means operable to interrupt a registering operation and means operable to interrupt a carriage shift operation; the combination of means for controlling a program of successive registrations including a toggle linkage, tripping means operable in time with the registration interrupting means or alternatively in time with the carriage shift interrupting means to break the toggle linkage, spring means thereupon operable to collapse the toggle linkage, a setting member movable upon collapse to said toggle linkage, a control train between said setting member and the clutch lever devices alternatively adjustable to control the engagement of the actuator drive and carriage shift clutches respectively, an adjustable blocking member, means for adjusting said blocking member into and out of the path of movement of said setting member to control the adjustment of said control train, a member operable alternatively by the actuator driving means and by the carriage shifting means to restore the toggle linkage, a member manually settable to break the toggle linkage and program terminating means operable to restore the manually settable member; with cooperating power driven means for operating the keyboard clearing means including a clearing clutch, normally restrained spring operated means for engaging the clearing clutch, means operable in response to manipulation of said manually settable member to release said spring operated means, a blocking member adjustable into the path of movement of said spring operated mechanism upon manipulation of said manually settable member and connections operable upon restoration of the manually settable member to move the blocking member for the spring operated means out of engagement therewith.

16. A calculating machine according to claim 15 wherein the means for adjusting the blocking member for the setting member comprises multiplier storage wheels and connections between said wheels and said blocking member operable to adjust said blocking member in response to the angular positions of the wheels; and having a second cooperating means including multiplier constant means operable to restore the storage wheels to a condition representing a previously stored multiplier value, detent pawls for the value storage wheels and connections operable by the clearing clutch to release the pawls.

17. In a calculating machine having a register, reversely operable cyclic differential actuators therefor, drive means including a drive control member alternatively settable to effect forward or reverse operation of said actuators, and means operable to interrupt operation of said drive means; means for setting said drive control member including spring energized mechanism, latching means for restraining said mechanism, a tripping element movable upon operation of said drive interrupting means to release said latching means, a pair of setting members each having operating relation with said drive control member and connected to and oppositely movable by said spring energized mechanism, an adjustable control plate, a member operable to adjust said control plate into the path of movement of one or alternatively the other of said setting members and a member operable by the drive means to reset said spring energized mechanism.

18. In a calculating machine having a register, reversely operable cyclic differential actuators therefor, drive means including a drive control member alternatively settable to effect forward or reverse operation of said actuators, and means operable to interrupt operation of said drive means; means for controlling a program of successive registrations including spring energized mechanism, latching means for restraining said mechanism, a tripping element movable upon operation of said drive interrupting means to release said latching means, a pair of setting members each having operating relation with said drive control member and connected to and oppositely movable by said spring energized mechanism, an adjustable control plate, a member having yieldable connection with said control plate and operable to adjust said plate into the path of movement of one of said setting members, a member operable by the drive means to reset said spring energized mechanism, and a member settable upon operation of said spring energized mechanism and operable upon resetting of said spring energized mechanism to adjust said control plate into the path of movement of said other setting member.

HERMAN GANG.

REFERENCES CITED

The following references are of record in the file of this patent:

UNITED STATES PATENTS

| Number | Name | Date |
|---|---|---|
| 2,382,661 | Pott | Aug. 14, 1945 |
| 2,408,097 | Pott | Sept. 24, 1946 |
| 2,416,809 | Avery | Mar. 4, 1947 |
| 2,419,760 | Britten, Jr. | Apr. 29, 1947 |
| 2,428,206 | Dustin | Sept. 30, 1947 |